United States Patent
Kim et al.

(10) Patent No.: US 11,108,517 B2
(45) Date of Patent: Aug. 31, 2021

(54) METHOD FOR TRANSMITTING AND RECEIVING REFERENCE SIGNAL IN WIRELESS COMMUNICATION SYSTEM AND DEVICE THEREFOR

(71) Applicant: LG ELECTRONICS INC., Seoul (KR)

(72) Inventors: Kyuseok Kim, Seoul (KR); Jiwon Kang, Seoul (KR); Kijun Kim, Seoul (KR); Hyungtae Kim, Seoul (KR); Minki Ahn, Seoul (KR); Sukhyon Yoon, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 16/497,780

(22) PCT Filed: Jan. 10, 2018

(86) PCT No.: PCT/KR2018/000491
§ 371 (c)(1),
(2) Date: Sep. 25, 2019

(87) PCT Pub. No.: WO2018/182150
PCT Pub. Date: Oct. 4, 2018

(65) Prior Publication Data
US 2021/0105110 A1    Apr. 8, 2021

Related U.S. Application Data

(60) Provisional application No. 62/476,735, filed on Mar. 25, 2017, provisional application No. 62/479,390, (Continued)

(51) Int. Cl.
*H04L 5/00* (2006.01)

(52) U.S. Cl.
CPC ................................ *H04L 5/0048* (2013.01)

(58) Field of Classification Search
CPC ..................................................... H04L 5/0048
See application file for complete search history.

(56) References Cited

U.S. PATENT DOCUMENTS

| 10,644,849 B2 * | 5/2020 | Yoon ..................... H04L 5/0051 |
| 2014/0321421 A1 * | 10/2014 | Popovic ................ H04L 5/0048 370/330 |
| 2017/0041172 A1 | 2/2017 | Furuskog et al. |

FOREIGN PATENT DOCUMENTS

| EP | 2978272 | 1/2016 |
| KR | 101604686 | 3/2016 |

(Continued)

OTHER PUBLICATIONS

PCT International Application No. PCT/KR2018/000491, International Search Report dated May 2, 2018, 3 pages.

(Continued)

*Primary Examiner* — Marisol Figueroa
(74) *Attorney, Agent, or Firm* — Lee, Hong, Degerman, Kang & Waimey

(57) ABSTRACT

The present invention relates to a method and a device for allowing a terminal to perform decoding in a wireless communication system. According to the present invention, provided are a method and a device for receiving, from a base station through DMRS symbols, a first demodulation reference signal (DMRS) and a second DMRS, which are set according to specific patterns, wherein: each of the first DMRS and the second DMRS is transmitted on a specific antenna port and is located on the same time axis symbol as at least one different DMRS transmitted on the other antenna port; a location of the time axis symbol of the second DMRS is determined according to a service type of transmitted data;

(Continued)

and the data are decoded by using the first DMRS and/or the second DMRS.

12 Claims, 33 Drawing Sheets

Related U.S. Application Data filed on Mar. 31, 2017, provisional application No. 62/520,698, filed on Jun. 16, 2017, provisional application No. 62/523,796, filed on Jun. 23, 2017.

(56) References Cited

FOREIGN PATENT DOCUMENTS

| | | |
|---|---|---|
| WO | 2016142862 | 9/2016 |
| WO | 2016148789 | 9/2016 |

OTHER PUBLICATIONS

European Patent Office Application Serial No. 18777211.6, Search Report dated Nov. 12, 2020, 12 pages.
Korean Intellectual Property Office Application No. 10-2019-7029168, Office Action dated Dec. 10, 2020, 5 pages.
Japan Patent Office Application No. 2019-552870, Office Action dated Dec. 15, 2020, 4 pages.
Vivo, "On front-loaded and additional DMRS design," 3GPP TSG RAN WG1 Meeting #88, R1-1703391, Feb. 2017, 4 pages.
Vivo, "Discussion on DMRS configurations," 3GPP TSG RAN WG1 AH NR Meeting, R1-1700275, Jan. 2017, 4 pages.
Nokia et al., "On details of DL DM-RS for NR physical data channels," 3GPP TSG RAN WG1#88 bis, R1-1705970, Apr. 2017, 7 pages.
Nokia et al., "DL DMRS patterns link performance evaluation," 3GPP TSG RAN WG1 NR Ad-Hoc Meeting, R1-1701104, Jan. 2017, 11 pages.
ZTE et al., "Discussion on downlink DMRS design," 3GPP TSG RAN WG1 NR Ad-Hoc Meeting, R1-1700135, Jan. 2017, 10 pages.
LG Electronics, "DMRS Design Issues in NR," 3GPP TSG RAN WG1 Meeting#86bis, R1-1609259, Oct. 2016, 8 pages.
ITL, "Considerations on DMRS pattern design for NR," 3GPP TSG RAN WG1 Meeting#88-bis, R1-1705794, Apr. 2017, 4 pages.
Shibata et al., "A Study on Throughput Improvement by DMRS Pattern Selection Considering Fading Environments," Proceedings of IEICE 2017 General Conference, Communication 1, p. 346, B-5-10, Mar. 7, 2017, 2 pages.
Korean Intellectual Property Office Application No. 10-2019-7029168, Notice of Allowance dated Jul. 6, 2021, 2 pages.
Qualcomm Incorporated, "Discussion on DL DMRS design," R1-1700806, 3GPP TSG-RAN WG1 NR Ad-Hoc, Jan. 2017, 6 pages.
Nokia et al., "On the DL DMRS structure for NR physical data channels," R1-1703180, 3GPP TSG RAN WG1#88, Feb. 2017, 7 pages.

\* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

METHOD FOR TRANSMITTING AND RECEIVING REFERENCE SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/000491, filed on Jan. 10, 2018, which claims the benefit of U.S. Provisional Application No. 62/476,735, filed on Mar. 25, 2017, 62/479,390, filed on Mar. 31, 2017, 62/520,698, filed on Jun. 16, 2017, and 62/523,796, filed on Jun. 23, 2017, the contents of which are all hereby incorporated by reference herein in their entireties.

TECHNICAL FIELD

The present invention relates to a wireless communication system and, more particularly, to a method and apparatus for generating a demodulation reference signal (DMRS) for decoding data and transmitting and receiving the generated DMRS in a wireless communication system.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An embodiment of the present invention provides a method and apparatus for generating and transmitting/receiving a demodulation reference signal (DMRS) for decoding data.

Another embodiment of the present invention provides a method and apparatus for generating and transmitting/receiving a DMRS for estimating a common phase error (CPE)/carrier frequency offset (CFO) value due to a Doppler effect.

Another embodiment of the present invention provides a method and apparatus for generating and transmitting/receiving additional DMRS for channel estimation in a high Doppler environment.

Another embodiment of the present invention provides a method and apparatus for mapping a DMRS for channel estimation and an additional DMRS to a resource area.

Another embodiment of the present invention provides a method and apparatus for configuring a DMRS and an additional DMRS in a time domain and a frequency domain in order to reduce RS overhead in the case of transmitting an additional DMRS.

Another embodiment of the present invention provides a method and apparatus for adjusting density of a DMRS and an additional DMRS mapped to a time domain and a frequency domain.

Technical objects to be achieved by the present invention are not limited to the aforementioned technical objects, and other technical objects not described above may be evidently understood by a person having ordinary skill in the art to which the present invention pertains from the following description.

Technical Solution

A method of performing decoding by a user equipment (UE) includes: receiving, from a base station (BS) a first demodulation reference signal (DMRS) and a second DMRS configured according to a specific pattern via DMRS symbols, wherein each of the first DMRS and the second DMRS is transmitted on a specific antenna port and is located on the same time axis symbol as at least one other DMRS transmitted on the other antenna port, and a position of a time axis symbol of the second DMRS is determined according to a service type of transmitted data; and decoding the data using at least one of the first DMRS and the second DMRS.

Furthermore, the time axis symbol position of at least one of the first DMRS and the second DMRS is shifted in units of a specific physical resource block (PRB), if a specific condition is met.

Furthermore, the specific condition is at least one of a condition that the number of DMRSs required according to the service type is one or more and a condition that the number of antenna ports in which the DMRSs are transmitted is two or more.

Furthermore, the specific PRB unit is determined according to a bandwidth allocated to the UE.

The method may further include: receiving control information representing the specific PRB unit from the BS.

Furthermore, the first DMRS and the second DMRS are turned off at every specific PRB.

A user equipment (UE) includes: a radio frequency (RF) unit transmitting and receiving a radio signal to and from the outside; and a processor functionally coupled with the RF unit, wherein the processor receives, from a base station (BS) a first demodulation reference signal (DMRS) and a second DMRS configured according to a specific pattern via DMRS symbols, wherein each of the first DMRS and the second DMRS is transmitted on a specific antenna port and is located on the same time axis symbol as at least one other DMRS transmitted on the other antenna port, and a position of a time axis symbol of the second DMRS is determined according to a service type of transmitted data, and the processor decodes the data using at least one of the first DMRS and the second DMRS.

Advantageous Effects

The present invention has the effect of decoding data by estimating a common phase error (CPE) and a carrier frequency offset (CFO) value due to Doppler Effect through a DMRS.

In addition, the present invention has an effect of estimating a channel through additional DMRS in a high Doppler environment.

In addition, the present invention has an effect of satisfying the requirements of a service by mapping a DMRS and an additional DMRS to a resource area according to the characteristics of a service.

The present invention has an effect of reducing RS overhead by adjusting density of DMRS and additional DMRSs in the case of transmitting the additional DMRSs.

It will be appreciated by persons skilled in the art that that the effects that could be achieved with the present invention are not limited to what has been particularly described hereinabove and other advantages of the present invention will be more clearly understood by a person skilled in the art to which the present invention pertains, from the following detailed description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

MODE FOR INVENTION

Figure 1:
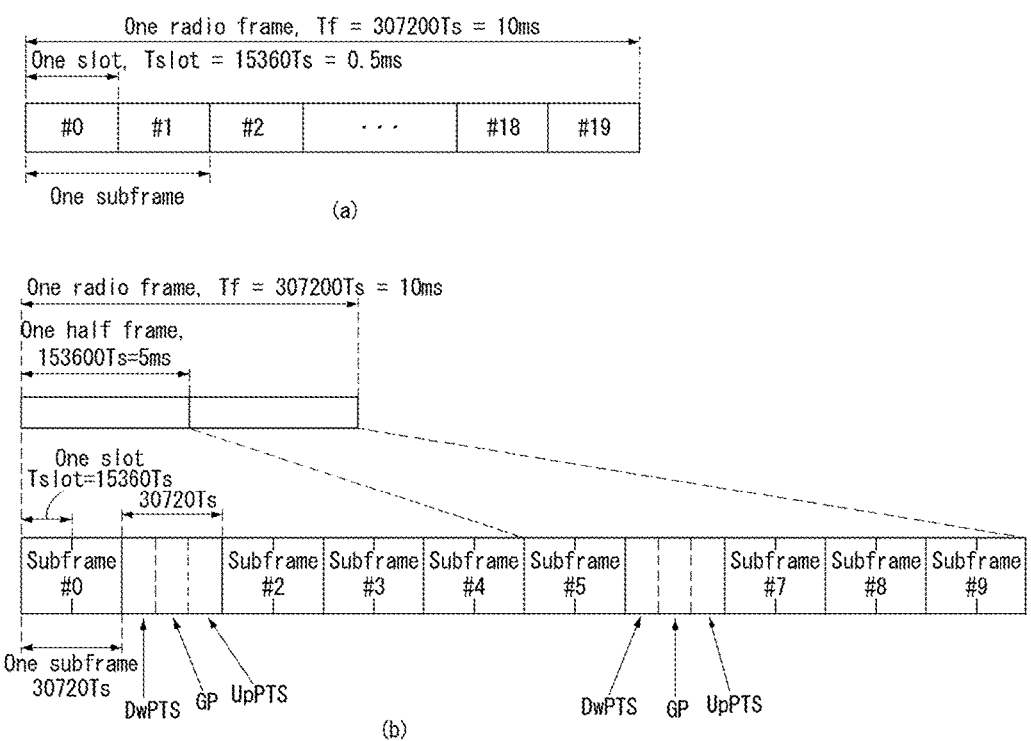
FIG. 1 shows a structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of T_s=1/(15000*2048). A UL and DL transmission includes the radio frame having a duration of T_f=307200*T_s=10 ms.

FIG. 1(a) exemplifies a radio frame structure type 1. The type 1 radio frame may be applied to both of full duplex FDD and half duplex FDD.

A radio frame includes 10 subframes. A radio frame includes 20 slots of T_slot=15360*T_s=0.5 ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of 153600*T_s=5 ms length each. Each half frame includes 5 subframes of 30720*T_s=1 ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 's' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half-frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
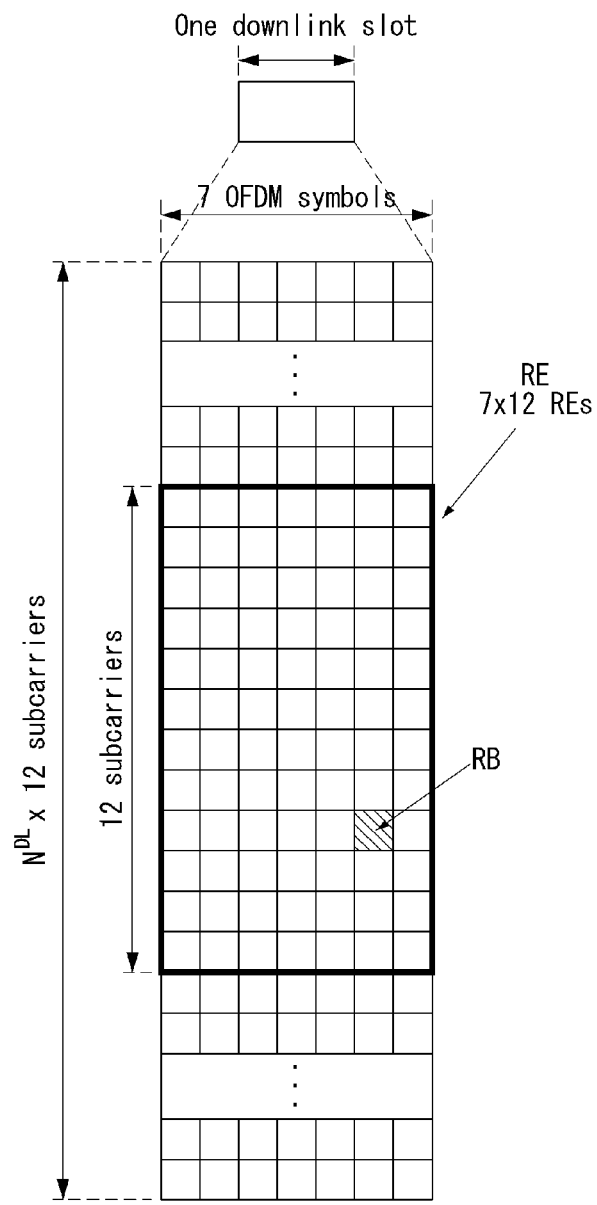
FIG. 2 is a diagram illustrating a resource grid for one downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
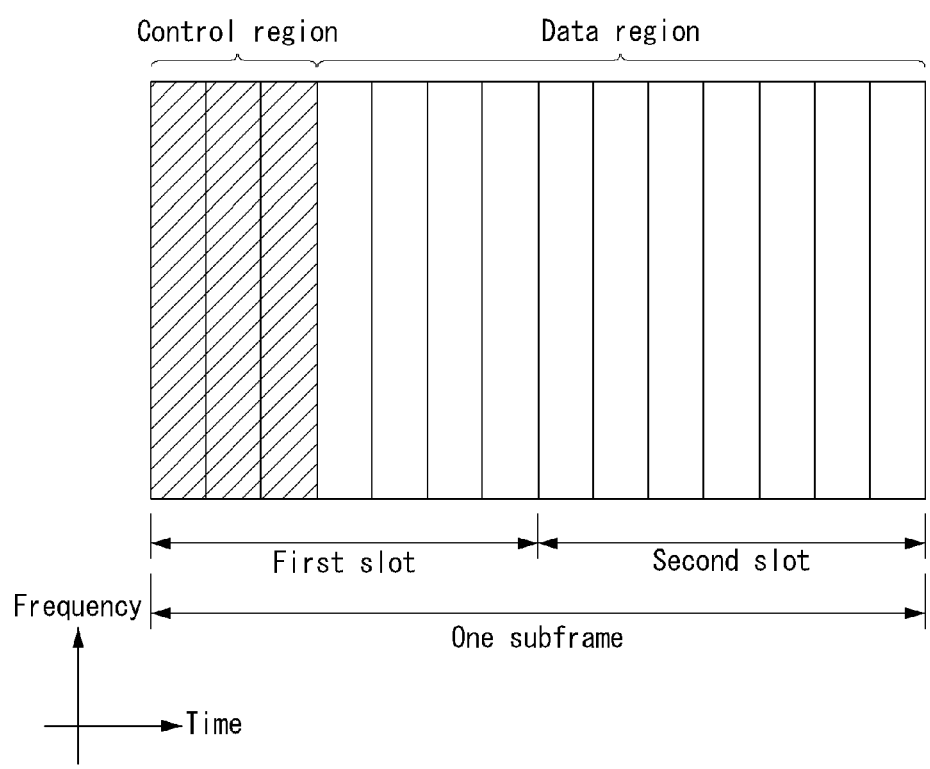
FIG. 3 shows a structure of a downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PH ICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or on an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (this is called a Radio Network Temporary Identifier (RNTI)) is masked to the CRC depending on the owner or use of a PDCCH. In the case that the PDCCH is a PDCCH for specific UE, an identifier unique to the UE, for example, a Cell-RNTI (C-RNTI) may be masked to the CRC. Or, in the case that the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
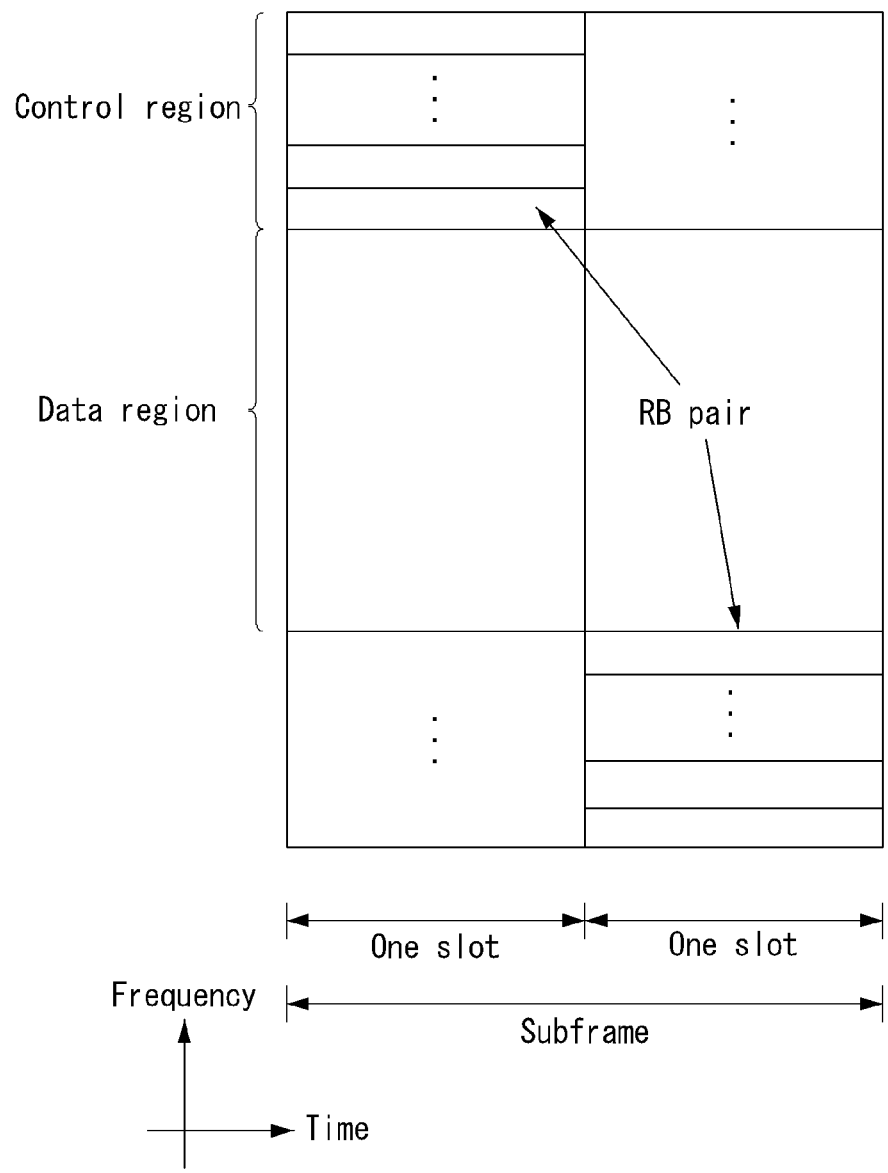
FIG. 4 shows a structure of an uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement may be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CaI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 5:
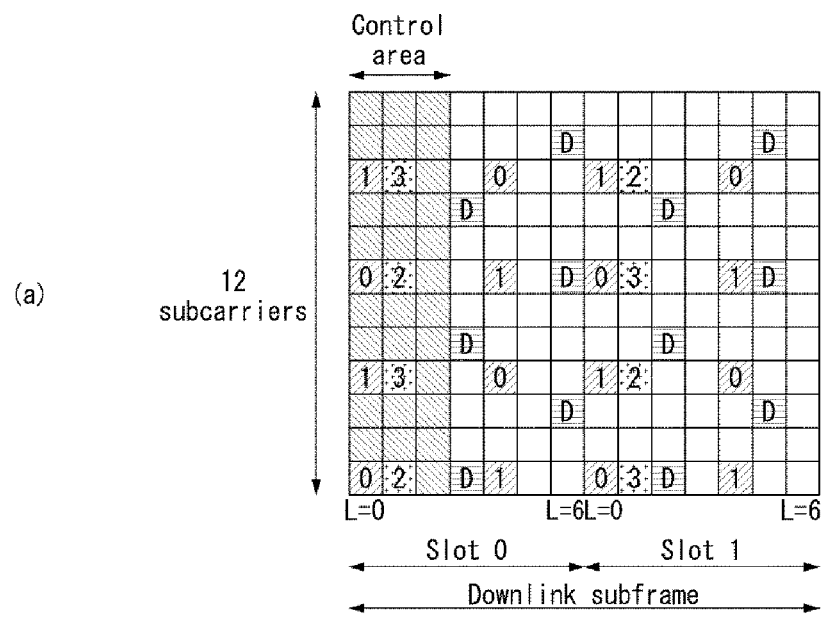
FIG. 5 illustrates a pattern of reference signals mapped to downlink resource block pairs in a wireless communication system to which the present invention may be applied.
Figure 5:
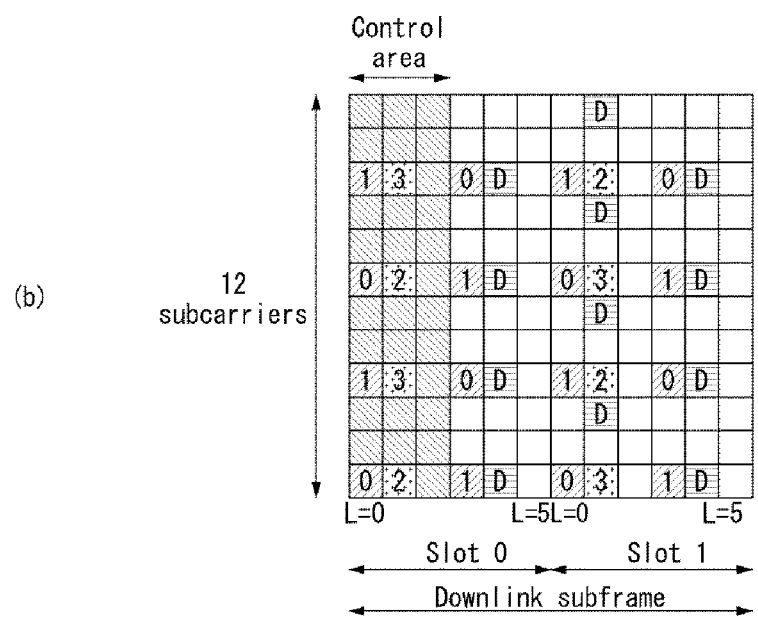

FIG. 5 illustrates reference signal patterns mapped to downlink resource block pairs in a wireless communication system to which the present invention may be applied.

Referring to FIG. 5, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 5a) and has a length of 12 OFDM symbols in the case of an extended cyclic prefix (CP) (FIG. 5b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, in the case that the number of transmission antennas of an eNB is two, CRSs for a No. 0 antenna port and a No. 1 antenna port are transmitted. In the case that the number of transmission antennas of an eNB is four, CRSs for No. 0 to No. 3 antenna ports are transmitted.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

The rule of mapping a CRS to a resource block is defined as below.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink, ns represents a slot index and, $N_{ID}^{cell}$ represents a cell ID. The mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific UE in the MIMO antenna transmission is used without a change in order to estimate a channel associated with and corresponding to a transmission channel transmitted in each transmitting antenna when the terminal receives the reference signal.

The 3GPP LTE system (e.g., release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

$$k = (k') \bmod N_{sc}^{RB} + N_{sc}^{RB} \cdot n_{PRB} \qquad [\text{Equation 2}]$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad [\text{Equation 3}]$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 3 and 4, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks.

$N_{RB}^{PDSCH}$ represents a frequency band of the resource block for the PDSCH transmission. ns represents the slot index and $N_{ID}^{cell}$ represents the cell ID. The mod represents the modulo operation. The position of the reference signal varies depending on the value in the frequency domain. Since $v_{shift}$ is subordinated to the cell ID, the position of the reference signal has various frequency shift values according to the cell.

In an LTE-A system of an evolved form of the LTE system, the design needs to be performed to support a maximum of 8 transmission antennas in the downlink of a base station. Accordingly, an RS for the maximum of 8 transmission antennas must be also supported. In the LTE system, only a downlink RS for a maximum of 4 antenna ports has been defined. In the case that a base station has 4 or a maximum of 8 downlink transmission antennas in the LTE-A system, an RS for such antenna ports needs to be additionally defined and designed. Regarding the RS for a maximum of 8 transmission antenna ports, both the above-described RS for channel measurement and the above-described RS for data demodulation must be designed.

One of important considerations in designing an LTE-A system is backward compatibility. That is, an LTE user equipment must well operate in the LTE-A system without any difficulty, and the system must support this. From a viewpoint of RS transmission, an RS for a maximum of 8 transmission antenna ports must be additionally defined in the time-frequency domain in which a CRS defined in LTE is transmitted every subframe in a full band. In the LTE-A system, if an RS pattern for the maximum of 8 transmission antenna is added to a full band every subframe using a method, such as that for the CRS of the existing LTE, RS overhead excessively increases.

Accordingly, an RS newly designed in the LTE-A system may be basically divided into two types, that is, an RS for channel measurement for the selection of an MCS, PMI, and the like (channel state information-RS, channel state indication-RS (CSI-RS), etc.) and a data demodulation (DM)-RS for data demodulation transmitted in 8 transmission antennas.

The existing CRS is used for channel measurement, the measurement of handover, etc. And for data demodulation, whereas the CSI-RS for channel measurement is designed for a channel measurement-oriented purpose. Furthermore, the CSI-RS for channel measurement may also be used for the measurement of handover. Since the CSI-RS is used to obtain information on the channel state only, it does not need to be transmitted every subframe unlike the CRS. In order to reduce overhead of the CSI-RS, the CSI-RS is intermittently transmitted on the time axis.

A DM-RS is dedicatedly transmitted to a UE scheduled in a corresponding time-frequency domain for data demodulation. That is, the DM-RS of a specific UE is transmitted only in a region in which a corresponding UE is scheduled, that is, only in a time-frequency domain in which data is received.

In the LTE-A system, an eNB has to transmit a CSI-RS for all antenna ports. To transmit a CSI-RS for a maximum of 8 transmission antenna ports every subframe has a disadvantage in that overhead is too great. Accordingly, the CSI-RS is not transmitted every subframe, but needs to be intermittently transmitted in the time axis in order to reduce corresponding overhead. That is, the CSI-RS may be periodically transmitted in the period of a multiple of one subframe or may be transmitted in a specific transmission pattern. In this case, the period or pattern in which the CSI-RS is transmitted may be configured by the eNB.

In order to measure a CSI-RS, a UE must be aware of the transmission subframe index of a CSI-RS for each CSI-RS antenna port of a cell to which the UE belongs, a CSI-RS resource element (RE) time-frequency position within the transmission subframe, and information on a CSI-RS sequence.

In the LTE-A system, an eNB needs to transmit a CSI-RS with respect to each of a maximum of 8 antenna ports. Resources used for the CSI-RS transmission of different antenna ports need to be orthogonal. When one eNB transmits CSI-RSs for different antenna ports, it may orthogonally allocate resources according to the FDM/TDM scheme by mapping the CSI-RSs for the respective antenna ports to different REs. Alternatively, the eNB may transmit the CSI-RSs for different antenna ports according to a CDM scheme for mapping the CSI-RSs to orthogonal codes.

When an eNB notifies its own cell UE of information on a CSI-RS, first, it has to notify the UE of information on a time-frequency to which a CSI-RS for each antenna port is mapped. Specifically, the information includes subframe numbers in which a CSI-RS is transmitted or the period in which a CSI-RS is transmitted, a subframe offset in which a CSI-RS is transmitted, an OFDM symbol number in which a CSI-RS RE of a specific antenna is transmitted, frequency spacing, an offset or shift value of an RE in the frequency axis, and so on.

Communication System Using Ultra-High Frequency Band

In a long term evolution (LTE)/LTE-A (LTE Advanced) system, an error value of an oscillator of a user equipment (UE) and a base station (BS) is defined as a requirement and described as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BSs is shown in Table 3 below.

TABLE 3

| BS class | Accuracy |
| --- | --- |
| Wide Area BS | ±0.05 ppm |
| Local Area BS | ±0.1 ppm |
| Home BS | ±0.25 ppm |

Therefore, a maximum difference of oscillators between the BS and the UE is ±0.1 ppm, and when an error occurs in one direction, a maximum of offset value of 0.2 ppm may occur. This offset value is multiplied by a center frequency and converted into Hz units appropriate for each center frequency.

Meanwhile, in the OFDM system, a center frequency offset (CFO) value appears to be different due to a frequency tone interval, and in general, a large CFO value has a relatively small effect in the OFDM system having a sufficiently large frequency tone interval. Therefore, an actual CFO value (absolute value) needs to be expressed as a relative value affecting the OFDM system, which is called a normalized CFO. The normalized CFO is expressed as a value obtained by dividing by the CEO value by the frequency tone interval. Table 4 below shows the CFO for each center frequency and oscillator error value and the normalized CFO.

TABLE 4

| Center frequency | Oscillator Offset | | | |
| --- | --- | --- | --- | --- |
| (subcarrier spacing) | ±0.05 ppm | ±0.1 ppm | ±10 ppm | ±20 ppm |
| 2 GHz(15 kHz) | ±100 Hz (±0.0067) | ±200 Hz (±0.0133) | ±20 kHz (±1.3) | ±40 kHz (±2.7) |
| 30 GHz(104.25 kHz) | ±1.5 kHz (±0.014) | ±3 kHz (±0.029) | ±300 kHz (±2.9) | ±600 kHz (±5.8) |
| 60 GHz(104.25 kHz) | ±3 kHz (±0.029) | ±6 kHz (±0.058) | ±600 kHz (±5.8) | ±1.2 MHz (±11.5) |

In Table 4, when the center frequency is 2 GHz (e.g., LTE Rel-8/9/10), the frequency tone interval (15 kHz) is assumed, and when the center frequency is 30 GHz and 60 GHz, the frequency tone interval of 104.25 kHz is used, thereby preventing performance degradation in consideration of a Doppler effect for each center frequency. Table 2 above is a simple example and it is obvious that other frequency tone intervals may be used for the center frequency.

Meanwhile, a Doppler spread phenomenon significantly occurs in a situation where the UE moves at high speed or moves in a high frequency band. The Doppler spread causes spread in the frequency domain, resulting in distortion of a received signal at the receiver's point of view. The Doppler spread may be expressed as $f_{doppler}=(v/\lambda)\cos\theta$. In this case, v is a moving speed of the UE, and $\lambda$ is a wavelength of a center frequency of a transmitted radio wave. $\theta$ is an angle between a received radio wave and the moving direction of the UE. The following description is based on the assumption that $\theta$ is zero.

Here, a coherence time is in inverse proportion to the Doppler spread. If the coherence time is defined as a time interval in which a correlation value of a channel response in the time domain is 50% or more, it is expressed as $$T_c \simeq \frac{9}{16\pi f_{doppler}}.$$

In the wireless communication system, Equation 4 below, which represents a geometric mean between the equation for Doppler spread and the equation for the coherence time, is mainly used.

$$T_c = \sqrt{\frac{9}{16\pi f_{doppler}}} = \frac{0.423}{f_{doppler}} \quad \text{[Equation 4]}$$

Figure 6:
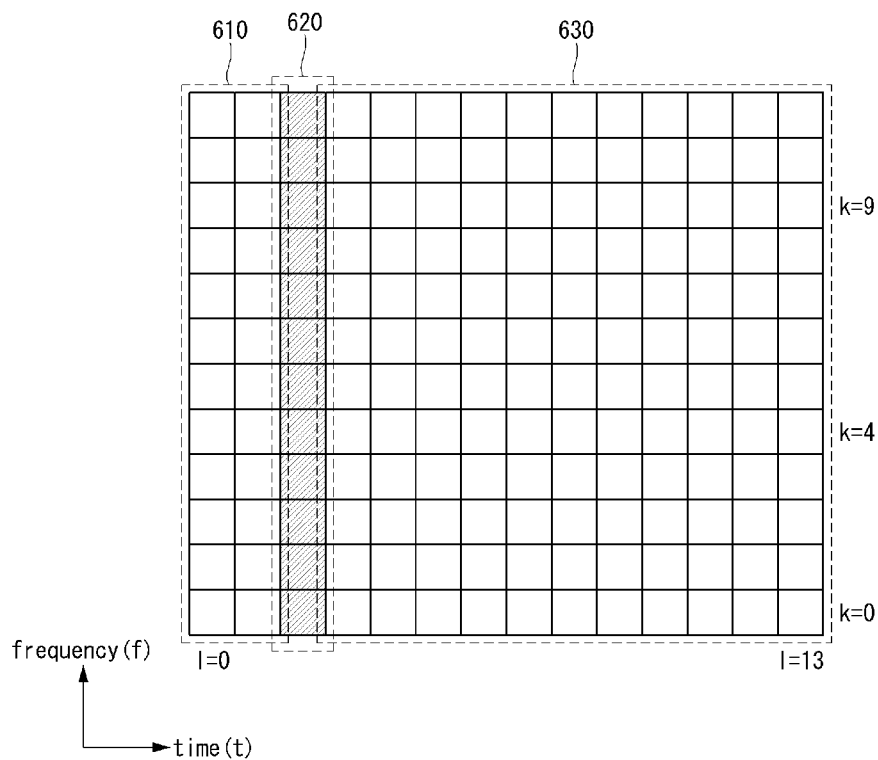
FIG. 6 shows an example of a structure of a resource area used in a communication system using mmWave to which the present invention may be applied.

FIG. 6 shows an example of a resource area structure used in a communication system using mmWave to which the present invention may be applied. A communication system using an ultra-high frequency band such as mmWave uses a frequency band different in physical properties from the related art LTE/LTE-A communication system. Accordingly, in a communication system using an ultra-high frequency band, a resource structure in a form different from that of the resource area used in the related art communication system has been discussed. FIG. 6 shows an example of a downlink resource structure of a new communication system.

When resource block (RB) pairs including 14 orthogonal frequency division multiplexing (OFDM) symbols on the horizontal axis and 12 frequency tones on the vertical axis are considered, first two (or three) OFDM symbols 610 may be allocated to a control channel (e.g., a physical downlink control channel (PDCCH)), the next one to two OFDM symbols 620 may be allocated to a demodulation reference signal (DMRS), and the remaining OFDM symbols 630 may be allocated to a data channel (e.g., a physical downlink shared channel (PDSCH)).

Meanwhile, the PCRS or PNRS or PTRS for CPE (or CFO) estimation described above in the resource area structure as shown in FIG. 6 may be included in partial resource elements (Res) of the area 630 to which the data channel is allocated, so as to be transmitted. Such a signal is a signal for estimating phase noise and may be a pilot signal as described above or a signal changed from a data signal or a duplicated signal.

The present invention proposes a method of transmitting a DMRS for channel estimation in downlink or uplink.

Figure 7:
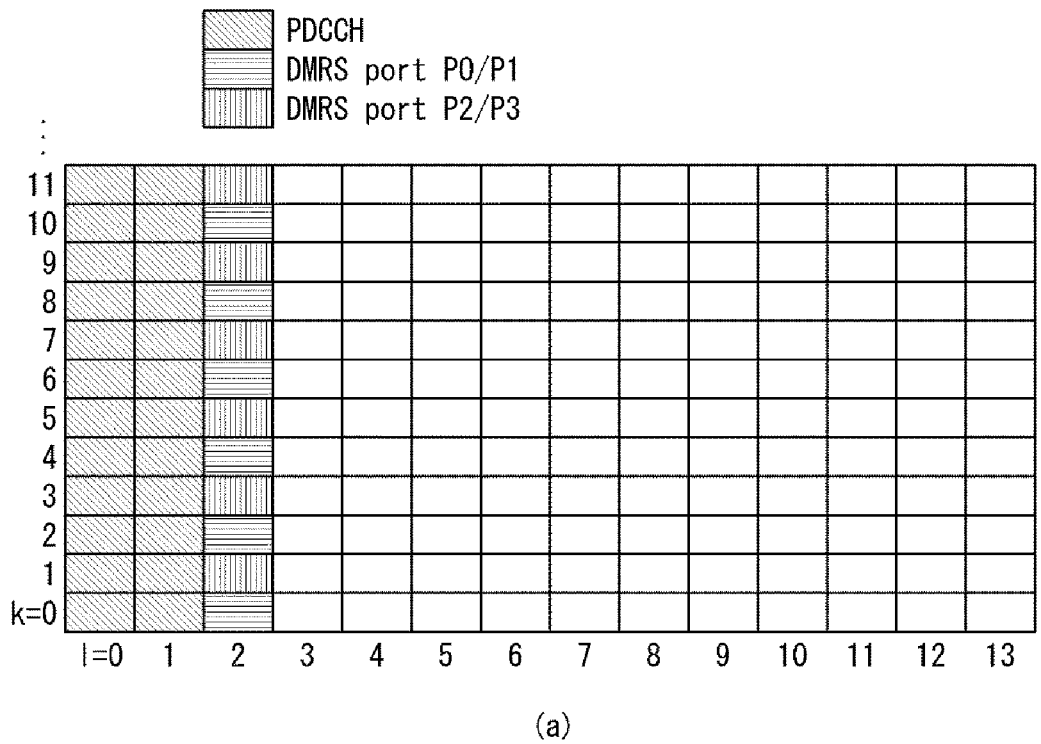
FIGS. 7 and 8 illustrate an example of patterns of demodulation reference signals (DMRSs) proposed in this disclosure.
Figure 7:
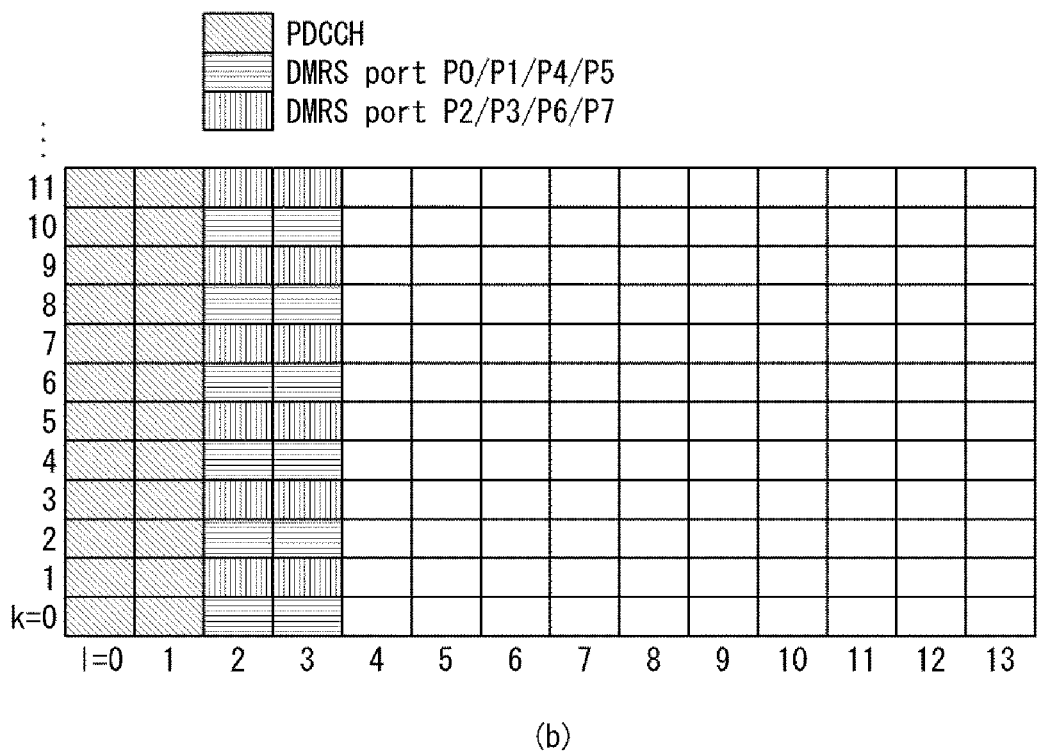
Figure 8:
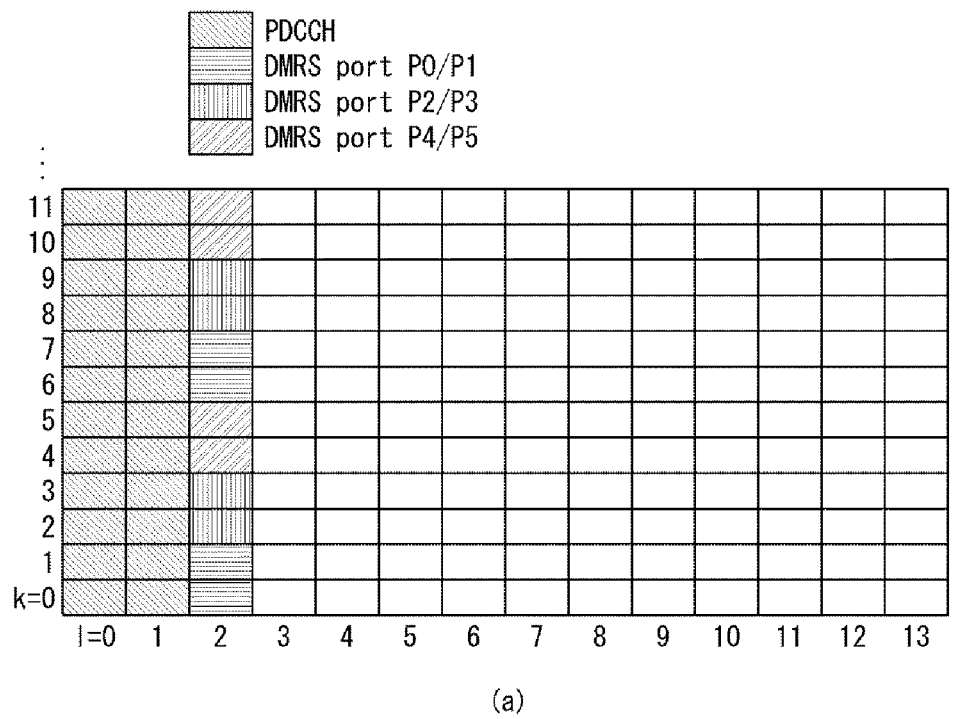
Figure 8:
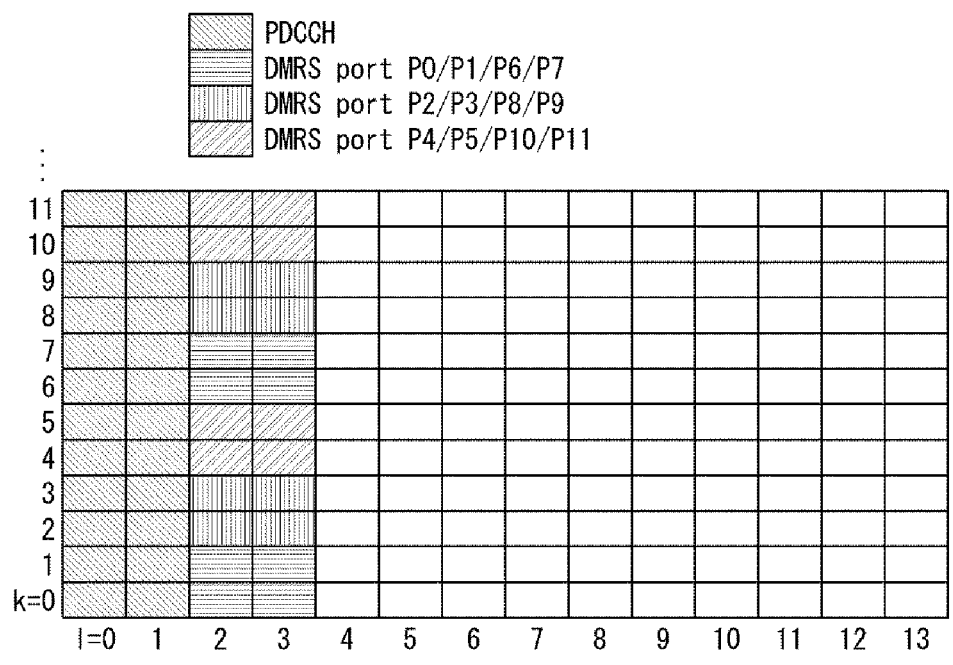

FIGS. 7 and 8 show an example of a pattern of DMRSs proposed in this disclosure.

Referring to FIGS. 7 and 8, a DMRS for estimating a channel may be mapped to one symbol or two symbols according to the number of antennas ports.

Specifically, an uplink DMRS and a downlink DMRS may be generated and mapped to resource areas by the following method. FIG. 7 illustrates an example of an uplink or downlink DMRS mapped to a physical resource according to type 1, and FIG. 8 illustrates an example of an uplink or downlink DMRS mapped to a physical resource according to type 2.

DMRS for PUSCH

A reference signal sequence r(m) for generating a downlink DMRS is generated by Equation 5 below when transform precoding for a PUSCH is not allowed.

In this case, a case where transform precoding for a PUSCH is not allowed may be a case of generating a transmission signal of a CP-OFDM type, for example.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 5]}$$

Here, c(i) denotes a pseudo-random sequence.

If transform precoding for the PUSCH is allowed, the reference signal sequence r(m) is generated by Equation 6 below.

In this case, an example of a case where transform precoding for a PUSCH is allowed may be a case where a transmission signal of a DFT-S-OFDM type is generated.

$$r(m) = e^{-j\frac{\pi qm(m+1)}{L}} \quad \text{[Equation 6]}$$

The generated DMRS of the PUSCH is mapped to a physical resource according to the Type 1 or Type 2 given by higher layer parameters as shown in FIGS. 7 and 8.

In this case, the DMRS may be mapped to a single symbol or a double symbol according to the number of antenna ports.

If transform precoding is not allowed, the reference signal sequence r(m) may be mapped to a physical resource by Equation 7 below.

$$a_{k,l}^{(p,\mu)} = \beta_{DMRS} w_f(k') \cdot w_t(l') \cdot r(2m + k' + m_0) \quad \text{[Equation 7]}$$

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \bar{l} + l'$$

In Equation 7, l is defined relative to the start of PUSCH transmission and $w_f(k')$, $w_t(l')$ and $\Delta$ are given by Tables 5 and 6 below.

Table 5 below shows an example of parameters for the DMRS of the PUSCH for Type 1.

TABLE 5

| p | Δ | $w_f(k')$ | | $w_t(l')$ | |
|---|---|---|---|---|---|
|   |   | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

Table 6 below shows an example of parameters for the DMRS of the PUSCH for Type 2.

TABLE 6

| p | Δ | $w_f(k')$ | | $w_t(l')$ | |
|---|---|---|---|---|---|
|   |   | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

Table 7 below shows an example of a time domain index l' and a supported antenna port p according to a higher layer parameter UL_DMRS_dur.

TABLE 7

| UL_DMRS_dur | l' | p Type 1 | Type 2 |
|---|---|---|---|
| Single-symbol DMRS | 0 | 1000-1003 | 1000-1005 |
| Double-symbol DMRS | 0, 1 | 1000-1007 | 1000-1011 |

Table 8 below shows an example of a start position $\bar{l}$ of the DMRS of the PUSCH.

TABLE 8

| | $\bar{l}$ | | | |
|---|---|---|---|---|
| | Single symbol DMRS | | Double symbol DMRS | |
| Uplink DMRS parameter | PUSCH mapping type A | PUSCH mapping type B | PUSCH mapping type A | PUSCH mapping type B |
| 0 | $l_0$ | $l_0$ | $l_0$ | $l_0$ |
| 1 | $l_0$,7 | | | |
| 2 | $l_0$,9 | | | |
| 3 | $l_0$,11 | | | |

DMRS for PDSCH

A reference signal sequence r(m) for generating a downlink DMRS is generated by Equation 8 below.

$$r(m) = \frac{1}{\sqrt{2}}(1 - 2 \cdot c(2m)) + j\frac{1}{\sqrt{2}}(1 - 2 \cdot c(2m+1))$$ [Equation 8]

Here, c(i) denotes a pseudo-random sequence.

The generated DMRS of the PDSCH is mapped to a physical resource according to Type 1 or Type 2 given by higher layer parameters as shown in FIGS. 7 and 8.

In this case, the reference signal sequence r(m) may be mapped to the physical resource by Equation 9 below.

$$a_{k,l}^{(p,\mu)} = \beta_{DMRS} w_f(k') \cdot w_t(l') \cdot r(2m + k' + m_0)$$ [Equation 9]

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \bar{l} + l'$$

In Equation 9, l is defined relative to the start of a slot, and $w_f(k')$, $w_t(l')$, and $\Delta$ are given by Table 10 and Table 11 below.

The time axis index l' and supporting antenna ports p are different depending on the higher layer parameter DL_DMRS_dur according to Table 12 below. The $\bar{l}$ value is varied depending on the higher layer parameter DL_DMRS_add_pos given in Table 13 according to the mapping type:

For PDSCH mapping type A: If higher layer parameter DL_DMRS_typeA_pos is equal to 3, $l_0$=3, or otherwise, $l_0$=2.

For PDSCH mapping type B: $l_0$ is mapped to a first OFDM symbol in a PDSCH resource for which DMRS is scheduled.

Table 9 below shows an example of parameters for DMRS configuration type 1 of the PDSCH.

TABLE 9

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

Table 10 below shows an example of parameters for DMRS configuration type 2 of the PDSCH.

TABLE 10

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

Table 11 below shows an example of l', which is a duration of PDSCH DMRS.

TABLE 11

| DL_DMRS_dur | l' | p Type 1 | Type 2 |
|---|---|---|---|
| Single-symbol DMRS | 0 | 1000-1003 | 1000-1005 |
| Double-symbol DMRS | 0, 1 | 1000-1007 | 1000-1011 |

Table 12 below shows an example of a start position $\bar{l}$ of the DMRS of the PDSCH.

TABLE 12

| | $\bar{l}$ | | | |
|---|---|---|---|---|
| | Single symbol DMRS | | Double symbol DMRS | |
| DL DMRS parameter | PDSCH mapping type A | PDSCH mapping type B | PDSCH mapping type A | PDSCH mapping type B |
| 0 | $l_0$ | $l_0$ | $l_0$ | $l_0$ |
| 1 | $l_0$,7 | | | |
| 2 | $l_0$,9 | | | |
| 3 | $l_0$,11 | | | |

In case of configuring a DMRS in the OFDM symbol unit as described above, if the DMRS is configured in a front symbol among the symbols for the fast decoding speed, there may be a problem in channel compensation.

That is, in the case of a high Doppler environment, appropriate channel compensation is difficult using only the DMRS configured in the front symbol because a channel variation is large in one slot (or subframe).

Accordingly, in order to solve this problem, the present invention provides a method of configuring additional DMRSs and decoding data by performing channel estimation through the configured DMRSs.

In addition, in the case of additionally configuring and transmitting the DMRSs, if a time axis density of the DMRSs is increased, RS overhead increases.

Therefore, a method of configuring a DMRS and an additional DMRS is provided to reduce such RS overhead.

Hereinafter, a DMRS basically configured in the present invention will be referred to as a first DMRS or front-loaded DMRS, and the additionally configured DMRS will be referred to as a second DMRS or additional DMRS.

FIGS. 9 to 14 illustrate an example in which a density of the DMRSs mapped to the resource area is greater than a density of the additional DMRSs, proposed in this disclosure.

Referring to FIGS. 9 to 14, when additional DMRSs are configured in addition to the front-loaded DMRSs, a frequency density of the additional DMRSs may be adjusted to reduce RS overhead.

Figure 9:
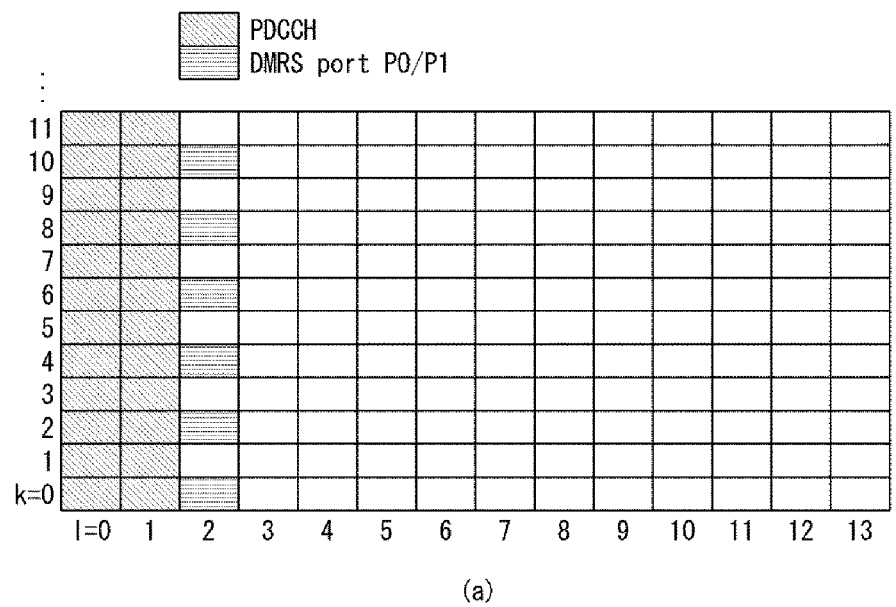
FIGS. 9 to 14 illustrate an example in which a density of DMRSs mapped to resource areas is greater than a density of additional DMRSs, proposed in this disclosure.
Figure 9:
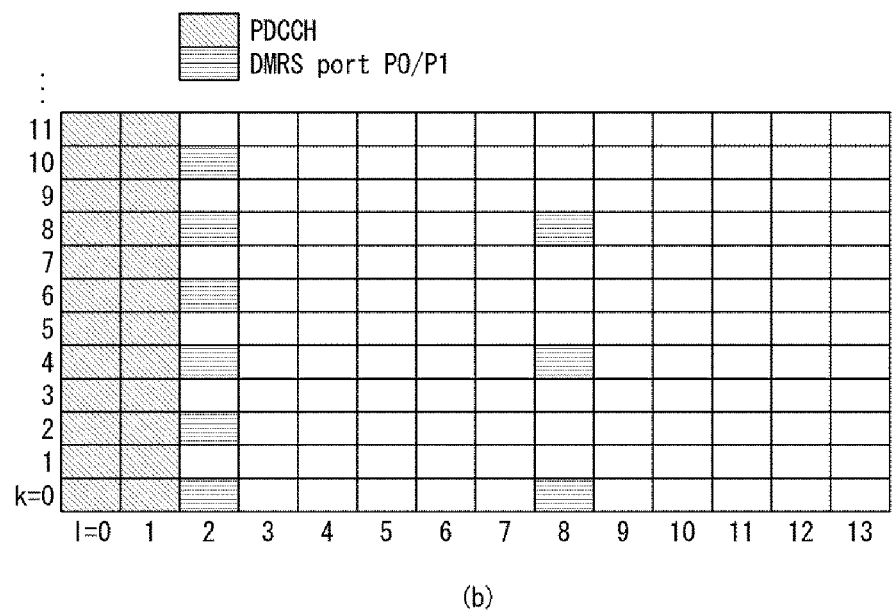

FIG. 9 illustrates an example of a method of setting a frequency density of front-loaded DMRSs to be equal to a case where only the front-loaded DMRSs are mapped and setting a frequency density of additional DMRSs to be smaller when the additional DMRSs and front-loaded DMRSs are mapped together to OFDM symbols.

In detail, when the additional DMRSs are additionally configured in the OFDM symbol in addition to the front-loaded DMRS, a frequency axis density of the front-loaded DMRSs may be the same as when only the front-loaded DMRSs are configured.

However, if the frequency axis density of the additional DMRSs is also the same as the density of the front-loaded DMRS, RS overhead may increase significantly due to an increase in the number of DMRSs.

Therefore, the frequency axis density of the additional DMRSs may be set lower than that of the front-loaded DMRSs so that the RS overhead is not significantly increased even if additional DMRSs are configured in the OFDM symbols in addition to the front-loaded DMRS.

For example, when the front-loaded DMRSs are configured in the third ODFM symbol (l=2) for the antenna ports p0 and p1 as shown in (a) of FIG. 9, the density of the front-loaded DMRSs does not change even if additional DMRSs are configured in the ninth OFDM symbol (l=8) as shown in (b) of FIG. 9.

However, in order to reduce the RS overhead due to the increase in the DMRS, the additional DMRSs configured in the ninth OFDM symbol may be sparser than the front-loaded DMRSs in the frequency axis as shown in (b) of FIG. 9.

In other words, when additional DMRSs are used, the frequency density of the front-loaded DMRSs is set to the same density as the frequency when only the front-loaded DMRSs are used and the density of the additional DMRSs is set to low density.

In this case, possible candidates for the frequency density of additional DMRSs may be informed from the BS to the UE through the RRC signaling. The BS may inform a specific value to the UE through DCI signaling so that to the corresponding frequency may be configured.

Figure 10:
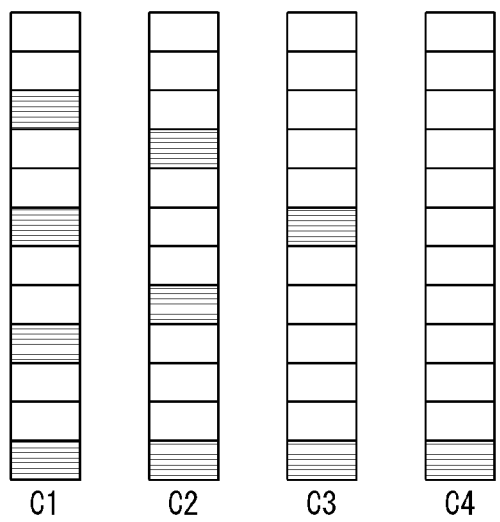

For example, after some or all of C1, C2, C3, and C4, which are frequency densities of available additional DMRSs shown in FIG. 10, are set for the UE through RRC signaling, a pattern of actual additional DMRSs may be dynamically set through DCI signaling.

In this case, when some of the available additional DMRS patterns is configured through RRC signaling, signaling overhead required for DCI signaling may be reduced.

Alternatively, when the BS informs the UE of a pattern of specific additional DMRSs through RRC signaling, the UE uses the additional DMRSs on the basis of the specific pattern configured through RRC signaling.

That is, the BS may inform about the pattern of the additional DMRSs to be used by the UE through RRC signaling, thereby eliminating signaling overhead due to the DCI signaling and configuring the pattern of the additional DMRSs through higher layer signaling.

Alternatively, the transceiver may configure an additional DMR through a preset pattern. For example, the transceiver may be configured to fixedly use a specific pattern among C1, C2, C3, and C4 which are patterns of the additional DMRSs shown in FIG. 10

Figure 11:
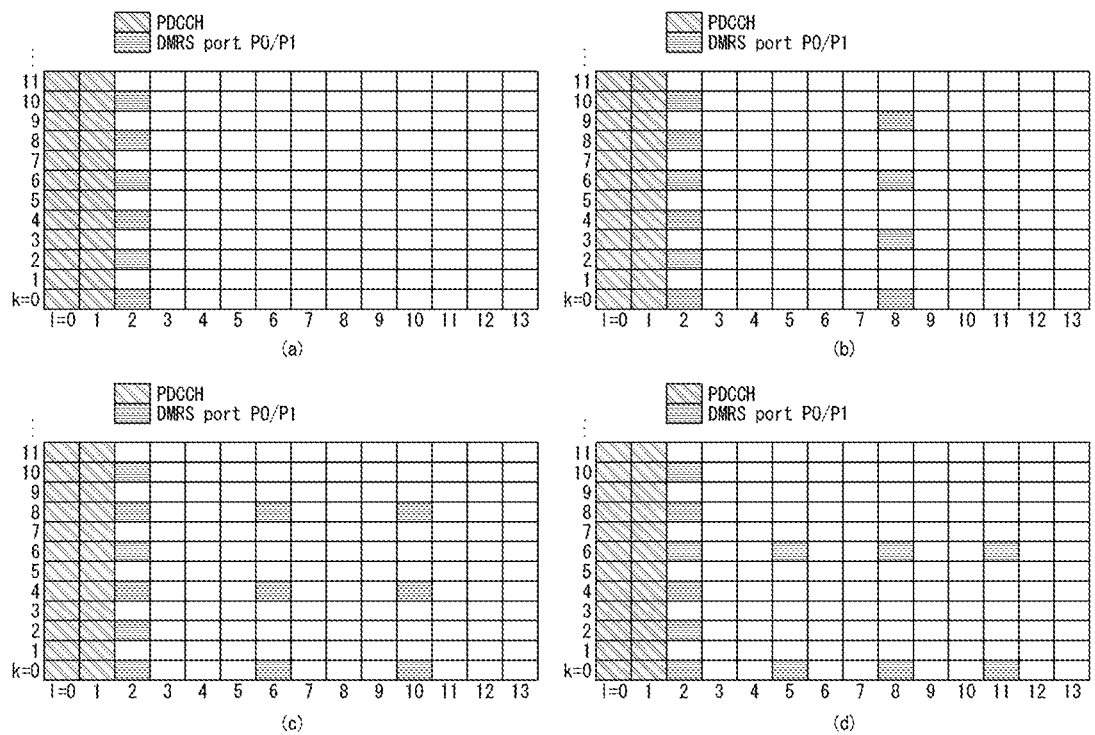

FIG. 11 shows an example of a method of setting a frequency density of additional DMRSS according to time density.

In detail, when additional DMRSs are configured, the frequency density of the front-loaded DMRS is the same as that when only the front-loaded DMRSs are configured, but the frequency density of the additional DMRSs may be varied according to the number of OFDM symbols in which the additional DMRSs are configured.

For example, when the front-loaded DMRSs are configured in the third ODFM symbol (l=2) for the antenna ports p0 and p1 as shown in FIG. 11, the density of the front-loaded DMRSs does not change even if additional DMRSs are configured as shown in (b) to (d) of FIG. 11.

However, when the additional DMRSs are additionally configured, the frequency density of the additional DMRSs may vary according to the number of ODFM symbols in which the additional DMRSs are configured, as shown in (b) to (d) of FIG. 11.

Specifically, when additional DMRSs are configured in two OFDM symbols, the additional DMRSs may be configured with a density lower than that of a case where the additional DMRSs are configured in one OFDM symbol.

In this case, the BS may inform the UE of the frequency density of the additional DMRSs determined according to a time density of the additional DMRSs through RRC signaling and/or DCI signaling.

For example, when the density of additional DMRSs according to the number of OFDM symbols in which the additional DMRSs are configured is as shown in FIG. 10, the BS informs the UE of one of set values of C1 to C4 through RRC signaling.

Table 13 shows an example of frequency density according to the number of additional DMRS that the BS informs the UE through RRC signaling.

TABLE 13

| Number of additional DMRSs | Frequency density |
| --- | --- |
| One additional DMRS | One of {C1, C2, C3, C4} |
| Two additional DMRSs | One of {C1, C2, C3, C4} |
| Three additional DMRSs | One of {C1, C2, C3, C4} |

When the BS configures additional DMRS frequency density through DCI signaling, at least one pattern of C1 to C4 of Table 13 and FIG. 10 may be configured in the UE through RRC signaling, and when a plurality of patterns are configured through RRC signaling, the UE may be instructed to use one of the configured patterns through RRC signaling.

For example, the BS may configure the patterns C1 and C2 as patterns of the additional DMRSs in the UE through RRC signaling, and then instructs the UE to use the C1 or C2 pattern as the patterns of the additional DMRSs through 1 bit of DCI signaling.

Alternatively, a pattern of the additional DMRSs may be configured in advance in the transceiver according to a time density (or number of OFDM symbols) of the additional DMRSs.

Table 14 below shows an example of patterns of additional DMRSs previously configured in the transceiver.

TABLE 14

| Number of additional DMRSs | Frequency density |
|---|---|
| One additional DMRS | C1 |
| Two additional DMRS | C2 |
| Three additional DMRS | C3 |

Figure 12:
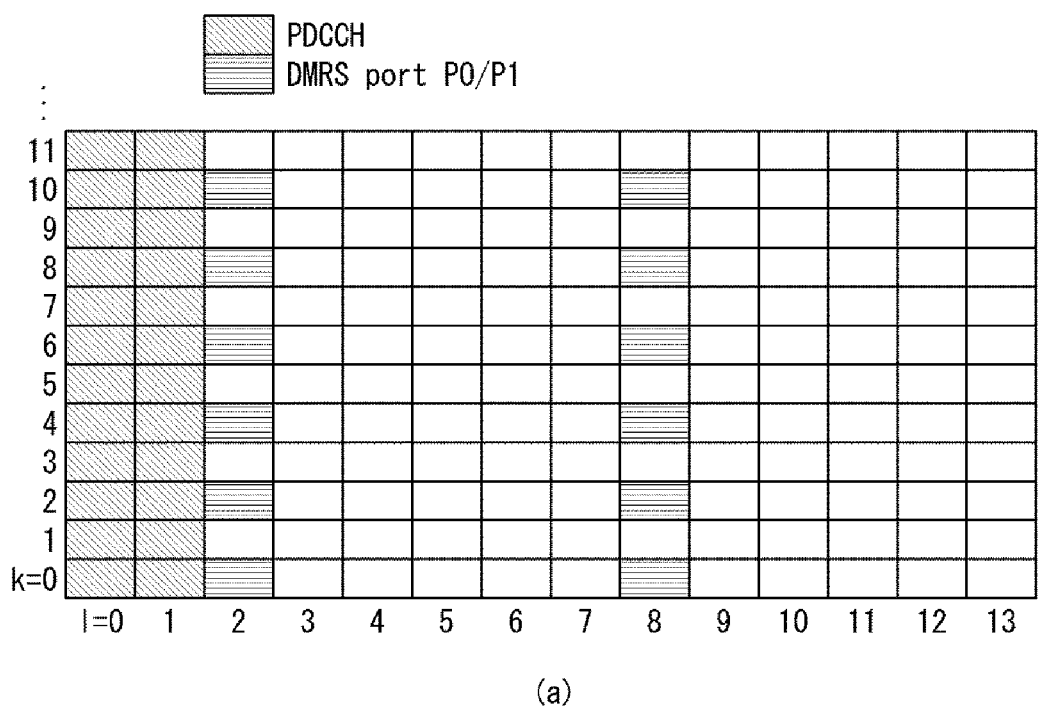
Figure 12:
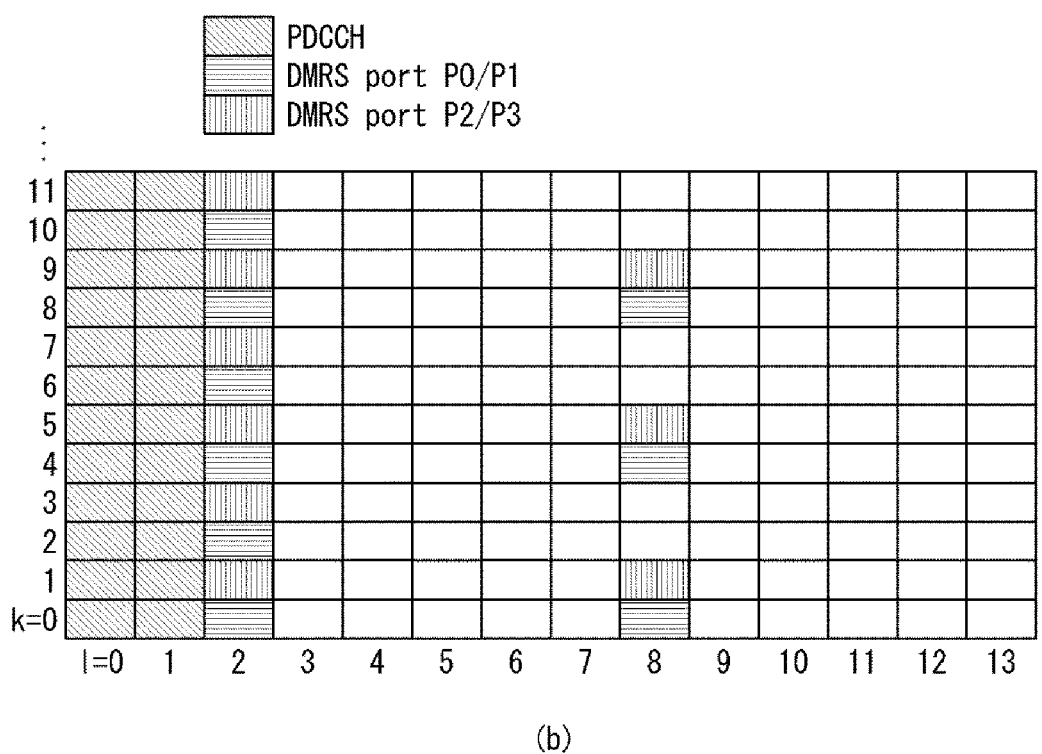
Figure 13:
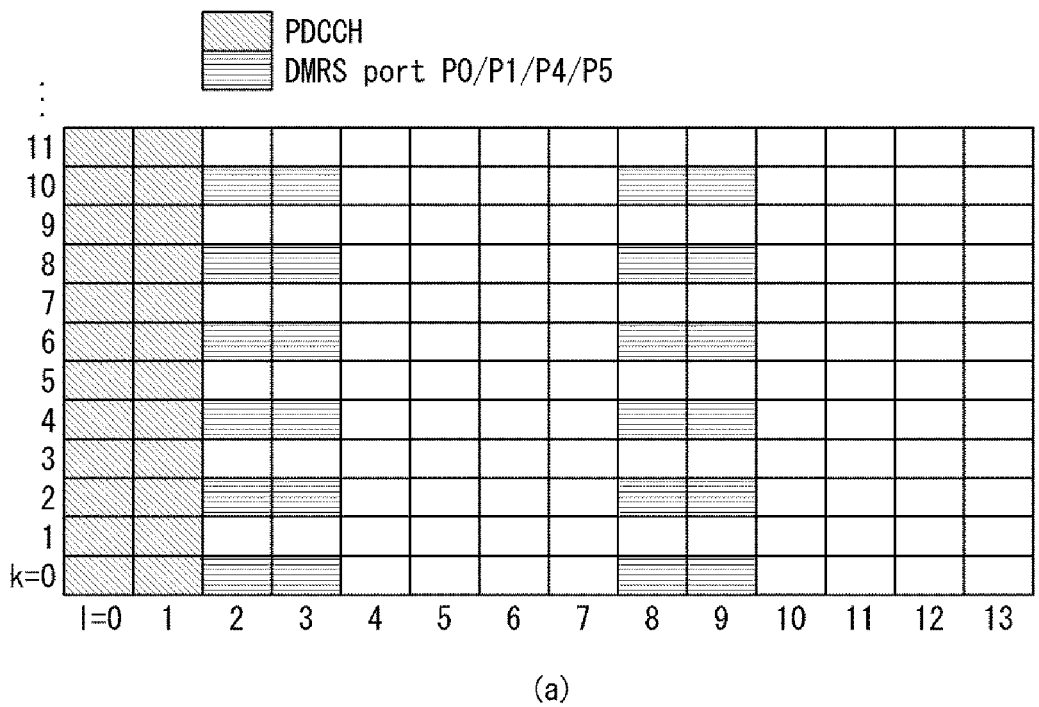
Figure 13:
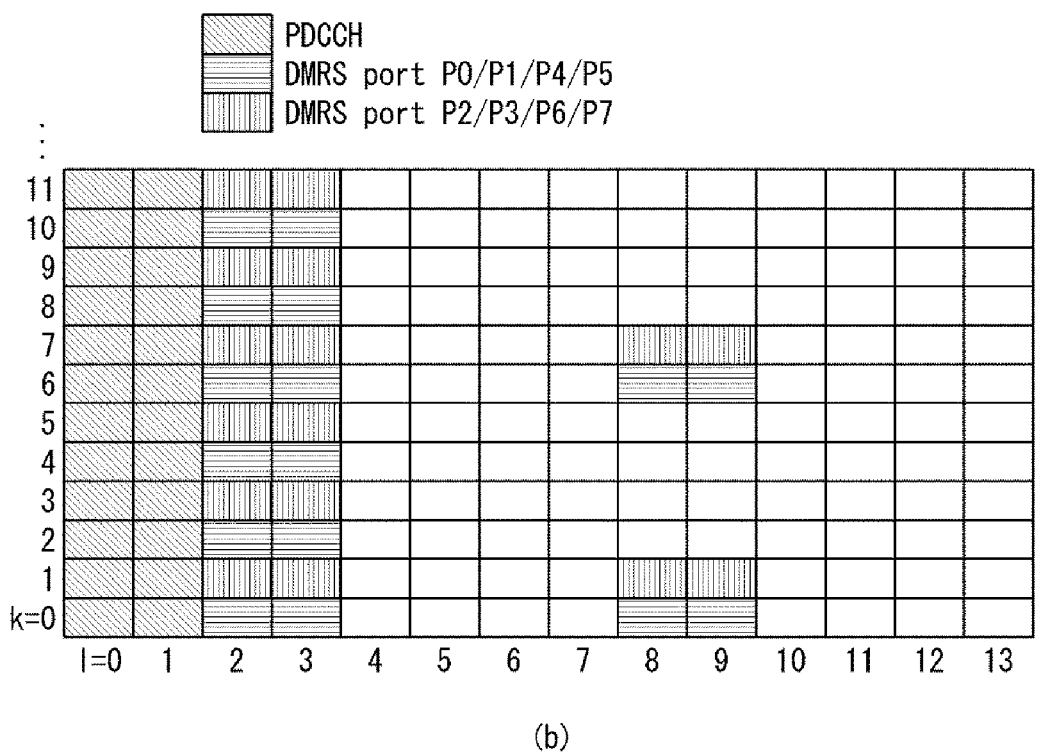
Figure 14:
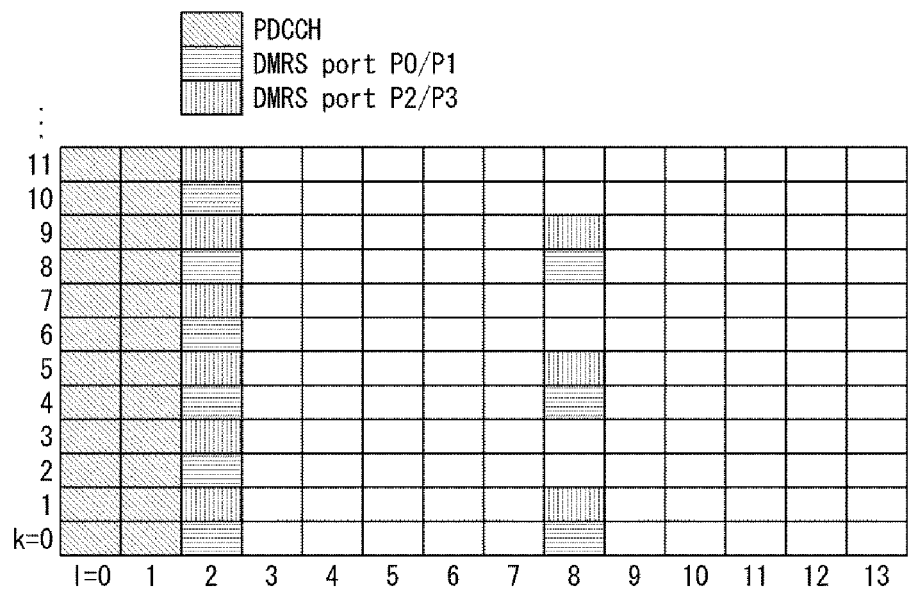
Figure 14:
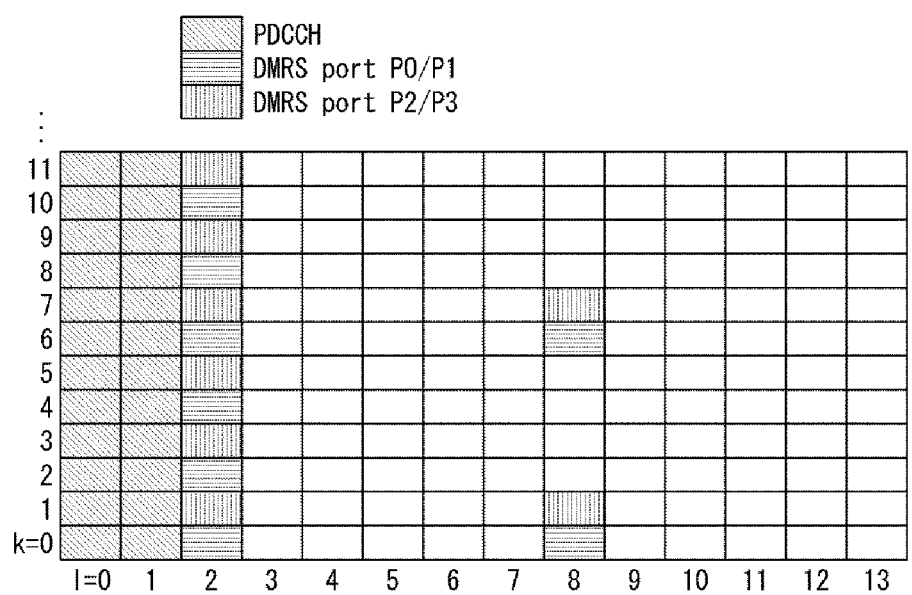

FIGS. 12 to 14 show an example of a method of setting a frequency density of additional DMRSs according to the number of transport layers.

Specifically, when the transport layer is smaller than a specific value, the frequency density of the additional DMRSs may be set equal to the frequency density of the front-loaded DMRSs, and when the transport layer is larger than the specific value, the frequency density of the additional DMRSs is may be set smaller than the frequency density of the front-loaded DMRSs.

For example, as shown in (a) of FIG. 12, if the transport layer of the DMRS is smaller than 3, the additional DMRS configured in the ninth OFDM symbol (l=9) is set to the same frequency density as the front-loaded DMRS set in the third OFDM symbol (l=2).

However, as shown in (b) of FIG. 12, if the DMRS is transmitted not only at the antenna ports p0 and p1 but also at p2 and p3 and the transport layer is 3 or greater, the additional DMRS configured in the ninth OFDM symbol (l=9) is configured with a frequency density lower than that of the front-loaded DMRS configured in the third OFDM symbol (l=2).

The BS may transmit transport layer information indicating a set value indicating a frequency density and/or the number of layers for which the frequency density of the additional DMRS is changed to the UE through RRC signaling and/or DCI signaling.

FIG. 13 shows an example of a method of configuring transport layer information indicating a set value indicating a frequency density and/or the number of layers whose frequency density of an additional DMRS is changed.

For example, when the set value is "C3" of FIG. 10 and the transport layer information is "5", the BS may transmit to the UE through RRC signaling including the set value and layer information.

The UE may know the frequency density of additional DMRS used according to the transport layer through RRC signaling transmitted from the BS.

If the transport layer is smaller than 5, additional DMRSs configured in the ninth (l=8) and tenth (l=9) OFDM symbols may be configured to have the same frequency density as that of the front-loaded DMRSs configured in the third (l=2) and fourth (l=3) OFDM symbols.

However, if the transport layer is larger than 5, additional DMRSs configured in the ninth (l=8) and tenth (l=9) OFDM symbols may be configured to have a frequency density lower than that of the front-loaded DMRSs configured in the third (l=2) and fourth (l=3) OFDM symbols.

For example, it may be set to 'C3' through RRC signaling in FIG. 10.

Alternatively, the UE may know the frequency density of additional DMRS used according to the transport layer through the DCI transmitted from the BS.

That is, the BS may set a frequency axis pattern of the additional DMRS by transmitting a set value and layer information indicating a pattern of additional DMRSs available through RRC signaling.

Thereafter, the BS may instruct the UE to use a specific DMRS pattern in a specific number or more layers through DCI signaling.

For example, the BS may set the frequency pattern of additional DMRSs of the UE by transmitting a set value indicating C1 and C2 of FIG. 10 and layer information having a value of '3' through RRC signaling.

Thereafter, the BS may instruct the UE to use C1 or C2 as a pattern of additional DMRSs through DCI signaling. (a) of FIG. 14 illustrates an example of using the 'C2' pattern of FIG. 10, and (b) of FIG. 14 illustrates an example of using the 'C3' pattern of FIG. 10.

Alternatively, the transceiver may set a pattern and density of additional DMRSs through preset values and/or layer information.

Figure 15:
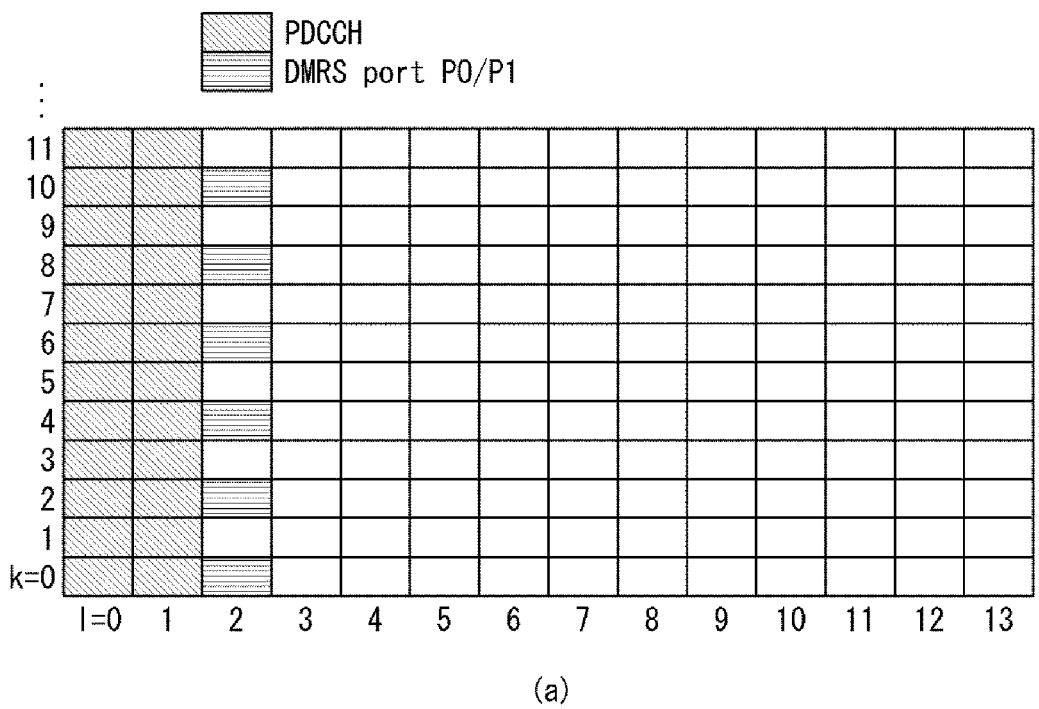
FIGS. 15 and 16 illustrate an example in which a density of DMRSs mapped to resource areas is equal to or greater than a density of additional DMRSs, proposed in this disclosure.
Figure 15:
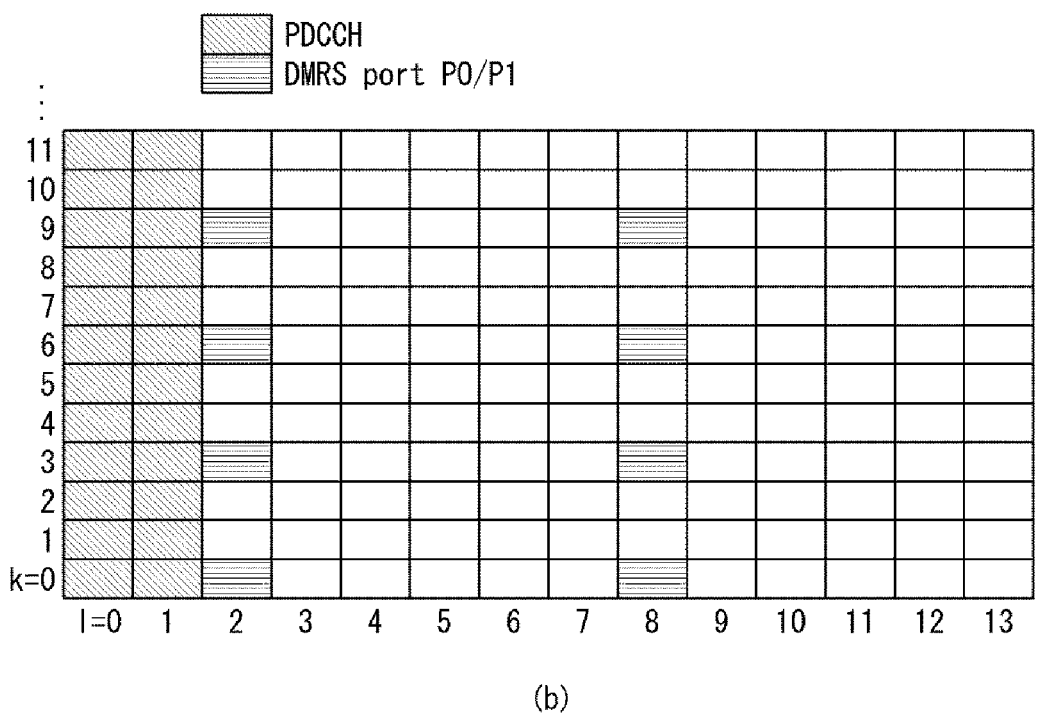
Figure 16:
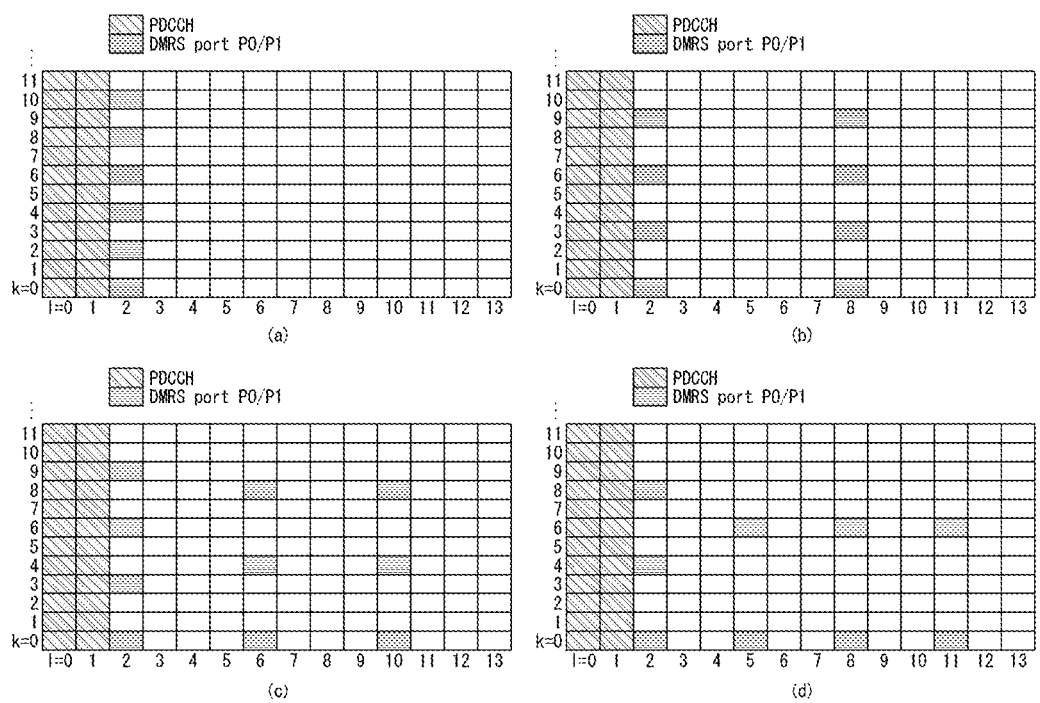

FIGS. 15 and 16 illustrate an example in which a density of the DMRSs mapped to a resource area is equal to or greater than a density of additional DMRSs, proposed in this disclosure.

Referring to FIGS. 15 and 16, when additional DMRSs are configured in addition to the front-loaded DMRSs, the density of the front-loaded DMRSs and/or the additional DMRSs may be adjusted to reduce RS overhead.

In detail, when additional DMRSs and front-loaded DMRSs are mapped to OFDM symbols together, RS overhead may increase significantly due to an increase in the number of DMRSs.

Therefore, in order to reduce RS overhead, the frequency density of the front-loaded DMRS and the additional DMRS may be set lower than a case where only the front-loaded DMRS is mapped.

In this case, the frequency density of the additional DMRS may be equal to or smaller than the frequency density of the front-loaded DMRS.

For example, when the front-loaded DMRS is configured in the third ODFM symbol (l=2) for the antenna ports p0 and p1 as shown in (a) of FIG. 15, if additional DMRS is configured in the ninth OFDM symbol (l=8) as shown in (b) of FIG. 15, the density of the front-loaded DMRS is set smaller than that of (a) of FIG. 15.

In addition, the frequency density of the additional DMRSs is also set to a lower density than the frequency density of the front-loaded DMRS shown in (a) of FIG. 15.

The BS may transmit a first set value indicating the frequency density of the front-loaded DMRSS and/or a second set value indicating the frequency density of the additional DMRSS to the UE through RRC signaling and/or DCI signaling.

When the BS transmits the first set value and the second set value to the UE through RRC signaling, the UE may set the front-loaded DMRSs and additional DMRSs on the basis of the received first set value and the second set value.

When the density of the front-loaded DMRSs and the additional DMRSs are set through DCI signaling, the BS may inform possible candidates for the frequency density of the front-loaded DMRS and the additional DMRS through the RRC signaling to the UE. The BS may inform a specific value through DCI signaling to the UE so that a corresponding frequency may be configured.

Table 15 below shows an example of possible candidates of front-loaded DMRS and additional DMRS according to FIG. 10.

TABLE 15

| Number of additional DMRSs | Possible candidates of Front-loaded DMRS | Possible candidates of Additional DMRS |
|---|---|---|
| One additional DMRS | One of {C1, C2, C3, C4} | One of {C1, C2, C3, C4} |
| Two additional DMRSs | One of {C1, C2, C3, C4} | One of {C1, C2, C3, C4} |
| Three additional DMRSs | One of {C1, C2, C3, C4} | One of {C1, C2, C3, C4} |

For example, the BS transmits at least one pattern of Tables 15 and C1 to C4 of FIG. 10 to the UE through RRC signaling. Subsequently, when the BS wants to set a specific pattern among at least one pattern as a frequency density of the front-loaded DMRS and/or additional DMRS, the BS transmits DCI signaling to the UE to instruct the specific pattern to be used as a frequency pattern of the front-loaded DMRS and/or additional DMRS.

Table 16 below shows an example of setting different frequency patterns according to the number of additional DMRSs through DCI signaling.

TABLE 16

| Number of additional DMRS | Pattern (density) of front-load DMRS | Pattern (density) of additional DMRS |
|---|---|---|
| One additional DMRS | C1 | C1 |
| Two additional DMRS | C1 | C2 |
| Three additional DMRS | C2 | C3 |

(a) of FIG. 16 shows an example in which only front-loaded DMRS is configured, and (b) to (d) show an example in which additional DMRS is additionally configured in addition to the front-loaded DMRS.

As illustrated in (b) to (d) of FIG. 16, when additional DMRSs are additionally configured as well as front-loaded DMRSs, the frequency density may be set to a density lower than the case (a) of FIG. 16 in which only the front-loaded DMRS is configured.

In addition, the frequency density of the front-loaded DMRS and the frequency density of the additional DMRS may be set to be different according to the number of OFDM symbols in which additional DMRS is configured.

That is, the frequency density of the front-loaded DMRS and the additional DMRS may be set to a low density in order to reduce RS overhead as the number of OFDM symbols in which the additional DMRS are configured increases.

Alternatively, the transceiver may set the pattern and density of the front-loaded DMRS and the additional DMRS through a first set value and/or a second set value which are previously set.

In this case, the method described above with reference to FIG. 14 and Table 15 may be applied to the second set value.

In addition, the first set value and the second set value may represent the same or different patterns according to the patterns of the front-loaded DMRS and the additional DMRS.

In addition, the first set value may be set in association with a time density of additional DMRS. That is, the first set value may be determined according to the number of OFDM symbols in which additional DMRS is configured.

Alternatively, the first set value and/or the second set value may be determined according to the number of transport layers.

Figure 17:
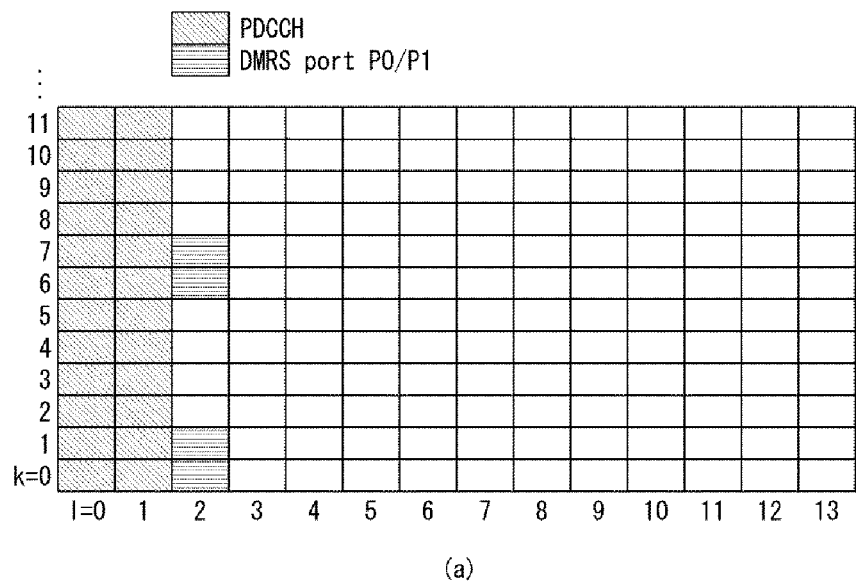
FIGS. 17 to 19 illustrate an example in which a density of DMRSs mapped to resource areas is smaller than a density of additional DMRSs, proposed in this disclosure.
Figure 17:
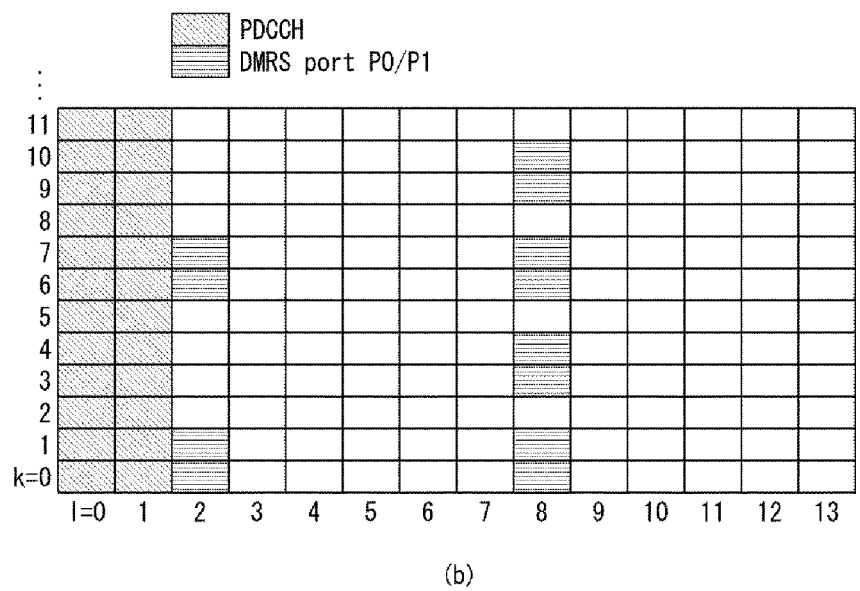
Figure 18:
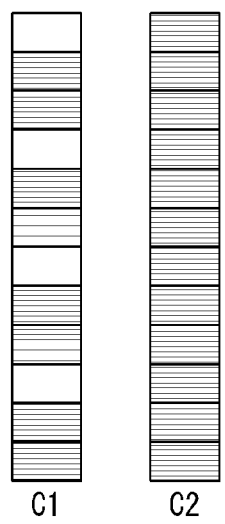
Figure 19:
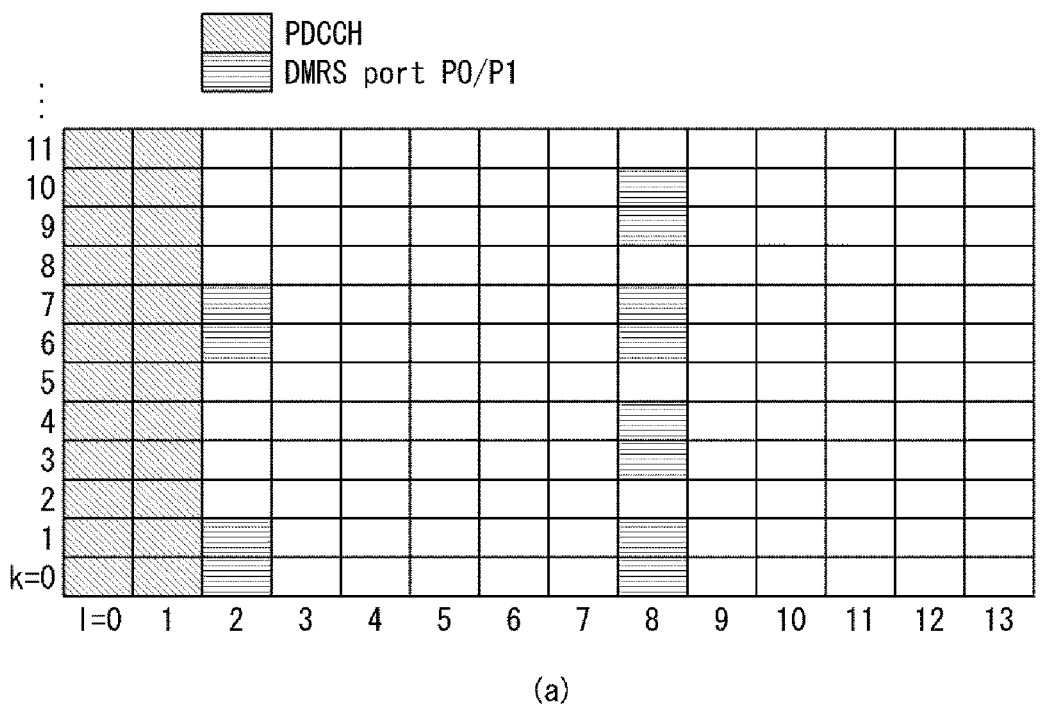
Figure 19:
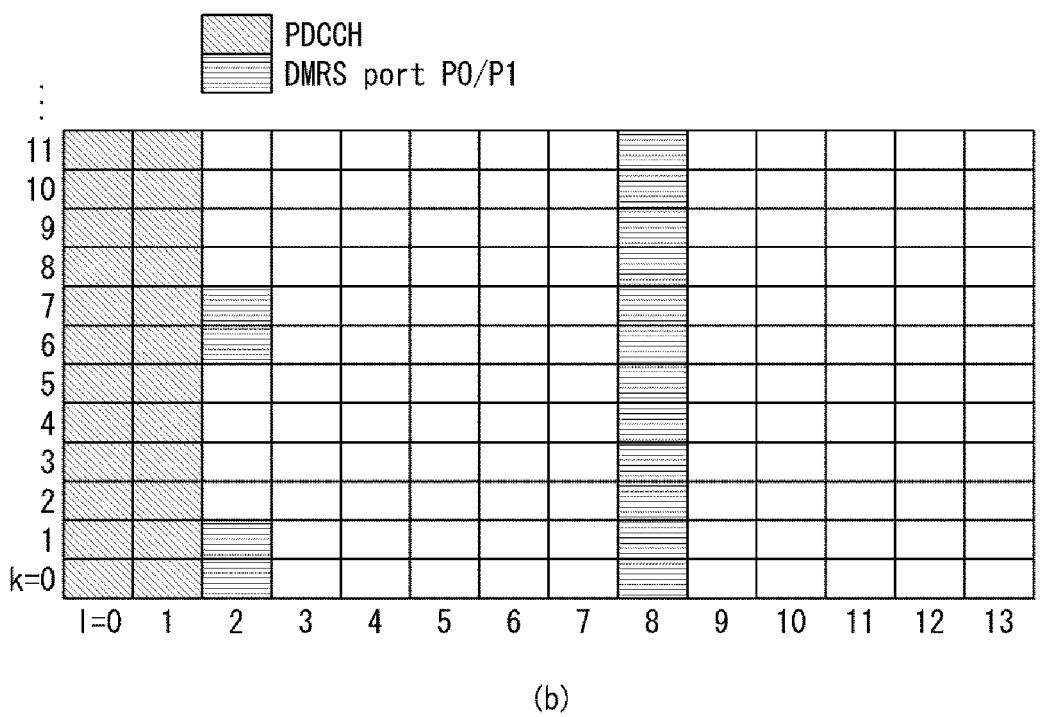

FIGS. 17 to 19 illustrate an example in which a density of DMRSs mapped to a resource area is smaller than a density of additional DMRSs, proposed in this disclosure.

Referring to FIGS. 17 to 19, when additional DMRS is set in addition to the front-loaded DMRS, a frequency density of the additional DMRS may be set to be higher than a frequency density of the front-loaded DMRS.

Specifically, when the front-loaded DMRS is set to a low density in the OFDM symbol, channel estimation performance may be low in a large delay spread channel environment. Therefore, in order to improve channel estimation performance in the large delay spread channel environment, if the additional DMRS and front-loaded DMRS are mapped together in the OFDM symbols, the frequency density of the front-loaded DMRSs is the same as that of a case where only the front-loaded DMRS is mapped and the frequency density of the additional DMRS may be set higher than that of the front-loaded DMRS.

For example, when the front-loaded DMRS is set to a low density in the third ODFM symbol (l=2) for the antenna ports p0 and p1 as shown in (a) of FIG. 17, an additional DMRS may be set to a higher density than the frequency density of the front-loaded DMRS in the ninth OFDM symbol (l=8) as shown in (b) of FIG. 17.

In this case, possible candidates for the frequency density of the additional DMRS may be notified from the BS to the UE through RRC signaling. The BS may inform a specific value to the UE through DCI signaling so that a corresponding frequency may be configured.

For example, after some or all of C1 and C2, which are frequency densities of available additional DMRSs shown in FIG. 18 are set for the UE through RRC signaling, a pattern of actual additional DMRSs may be dynamically set through DCI signaling.

In this case, when some of the available additional DMRS patterns is configured through RRC signaling, signaling overhead required for DCI signaling may be reduced.

Alternatively, when the BS informs the UE of a pattern of specific additional DMRSs through RRC signaling, the UE uses the additional DMRSs on the basis of the specific pattern configured through RRC signaling.

That is, the BS may inform about the pattern of the additional DMRSs to be used by the UE through RRC signaling, thereby eliminating signaling overhead due to the DCI signaling and configuring the pattern of the additional DMRSs through higher layer signaling.

Alternatively, the transceiver may configure an additional DMR through a preset pattern. For example, the transceiver may be configured to fixedly use a specific pattern among C1 and C2 which are patterns of the additional DMRSs shown in FIG. 18.

(a) of FIG. 19 illustrates an example in which additional DMRSs are configured according to the pattern of 'C1', and (b) illustrates an example in which additional DMRSs are configured according to the pattern of 'C2'.

The method of setting a frequency density of the front-loaded DMRS and the additional DMRS described above with reference to FIGS. 7 to 19 may be applied to uplink as well as downlink.

Figure 20:
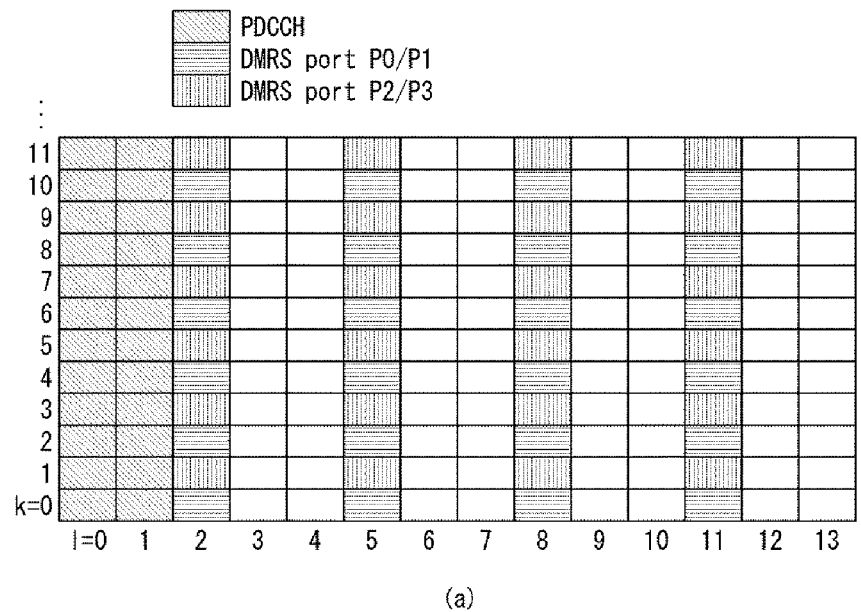
FIG. 20 shows an example of a method of configuring an additional DMRS proposed in this disclosure.
Figure 20:
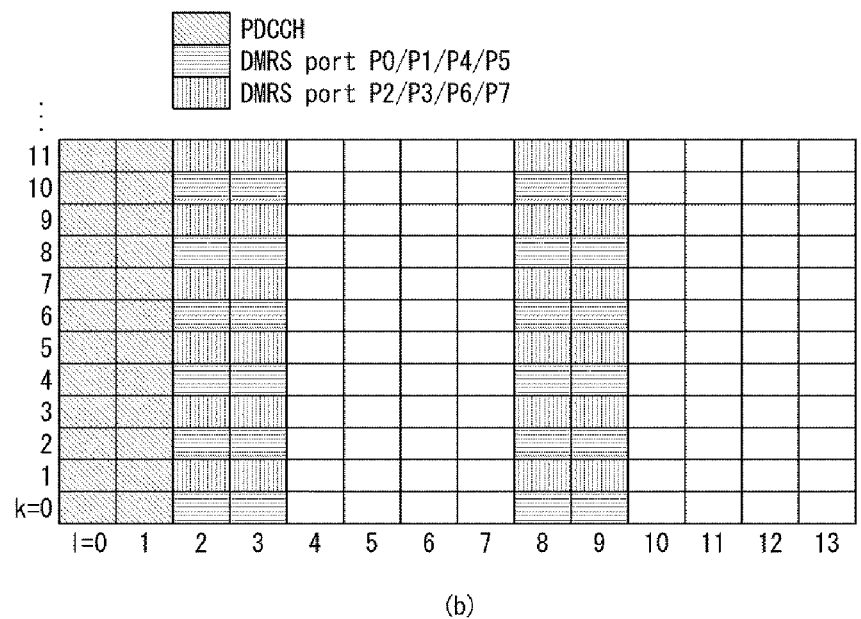

FIG. 20 shows an example of a method of configuring an additional DMRS proposed in this disclosure.

In order to estimate a channel changing on the time axis, as shown in (a) and (b) of FIG. 20, the front-load DMRS and a DMRS having the same pattern as that of the front-load DMRS need to be additionally configured on the time axis.

(a) of FIG. 20 illustrates an example of a front-loaded DMRS and an additional DMRS configured in one ODFM symbol, and (b) illustrates an example of a front-loaded DMRS and an additional DMRS configured in two OFDM symbols.

However, although a large number of additional DMRSs are required to support channel estimation of the fast moving UE (e.g., 500 km/h), such a large number of additional DMRSs significantly increases RS overhead as described above.

Therefore, hereinafter, a method of increasing the time axis density of the DMRS while maintaining low RS overhead is proposed.

Figure 21:
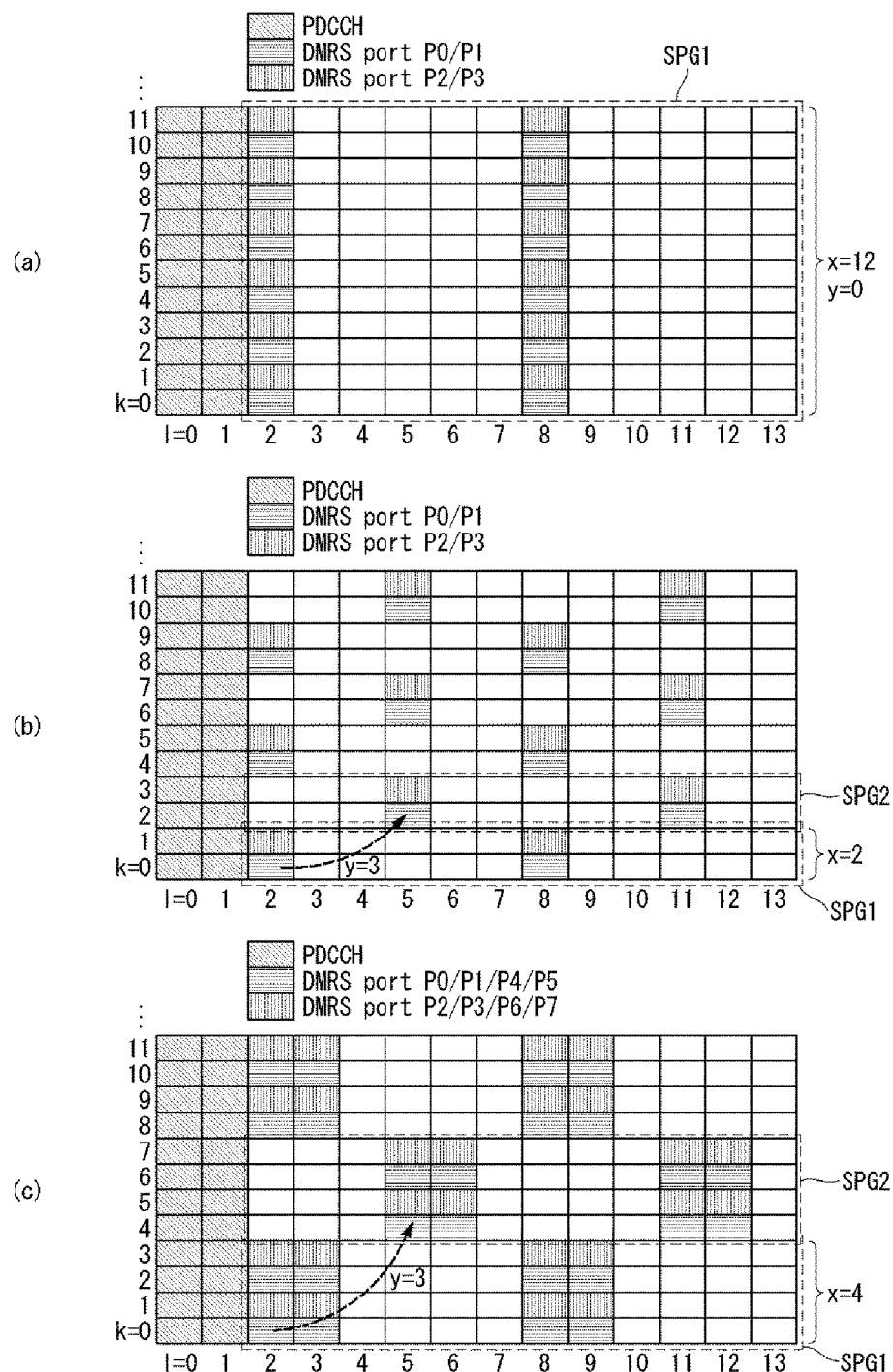
FIGS. 21 to 23 show examples of a method of configuring a DMRS and an additional DMRS proposed in this disclosure.
Figure 22:
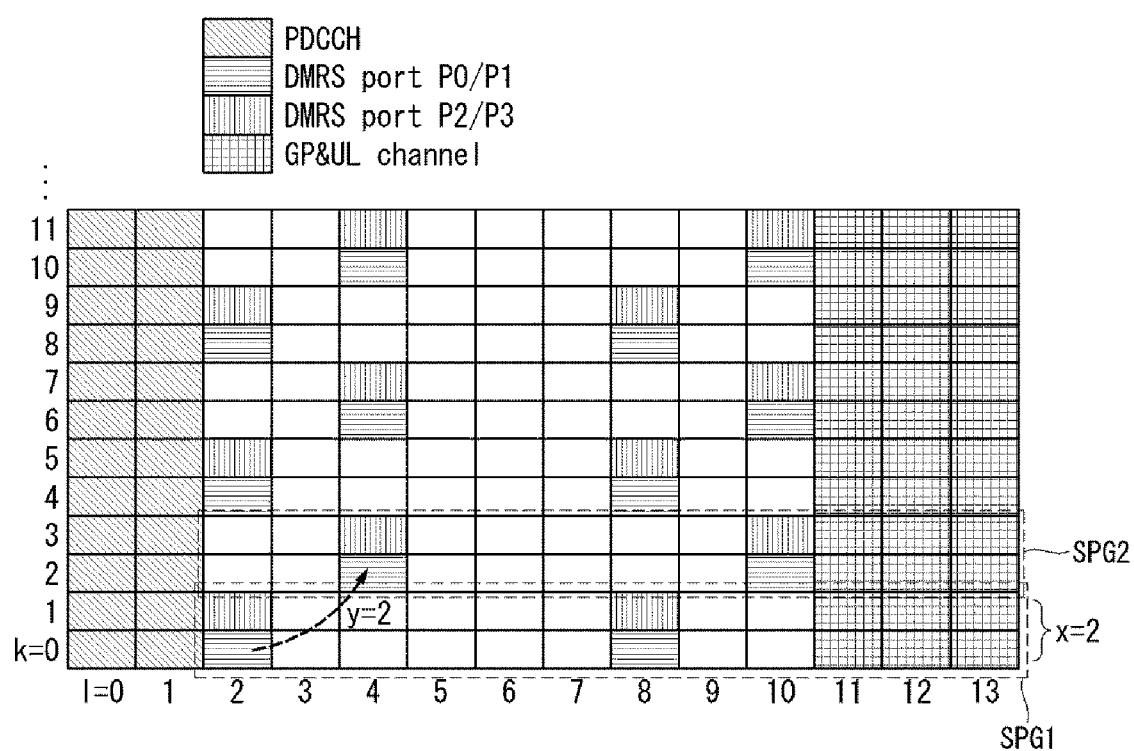
Figure 23:
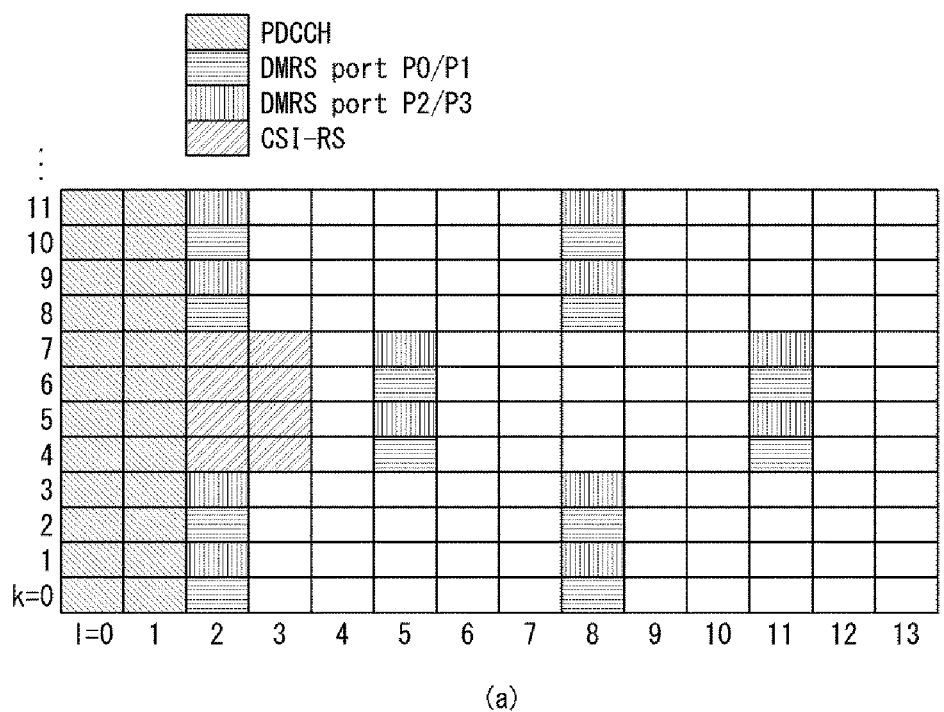
Figure 23:
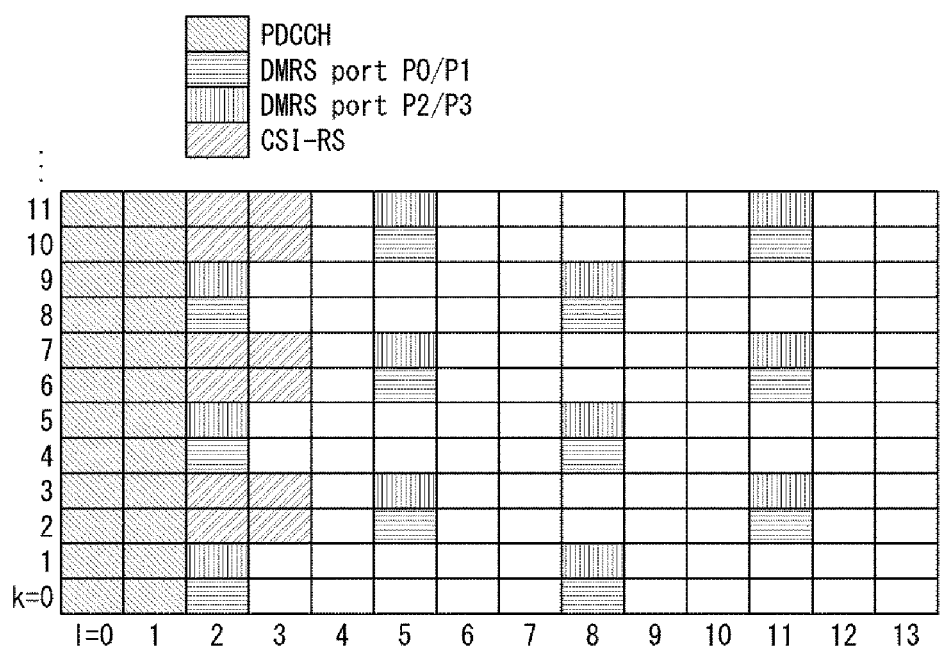

FIGS. 21 to 23 show examples of a method of configuring a DMRS and an additional DMRS proposed in this disclosure.

Referring to FIGS. 21 to 23, an increase in RS overhead due to an increase in density of the DMRSs on the time axis may be prevented by increasing a time density of the DMRS and decreasing a frequency density Specifically, when the BS configures additional DMRS as well as front-load DMRS, the BS transmits first pattern information indicating a same frequency axis unit having the same DMRS pattern and second pattern information indicating a time axis interval between the same DMRS pattern group (SPG) to the UE.

In this case, the first pattern information and the second pattern information may be transmitted to the UE through higher layer signaling (e.g. RRC and/or MAC CE) and/or DCI signaling.

The BS configures the front-load DMRS and the additional DMRS to be located in the same OFDM symbol in the SPG. The DMRSs between the SPGs are set to be located at an interval of the OFDM symbol indicated by the second pattern information.

(a) of FIG. 21 illustrates an example in which the first pattern information is set to '12' and the second pattern information is set to '0', which is the same as a case where the front-loaded DMRS and the addition DMRS are set in one symbol.

(b) of FIG. 21 illustrates an example in which the first pattern information is set to '2' and the second pattern information is set to '3'. When (b) and (a) of FIG. 21 are compared, (a) and (b) have the same RS overhead but (b) have more DMRSs configured on the time axis.

Therefore, when the front-loaded DMRS and the addition DMRS are configured as shown in (b) of FIG. 21, the UE may obtain sample values for channel estimation larger than a case where the front-loaded DMRS and the additional DMRS are configured as shown in (a) of FIG. 21.

(c) of FIG. 21 illustrates an example in which the first pattern information is set to '4' and the second pattern information is set to '3'. In this case, RS overhead is the same as a case where two front-loaded DMRSs and additional DMRSs are configured in one symbol but the UE may efficiently perform channel estimation as described above.

In this manner, channel estimation performance in the time-varying channel may be enhanced by increasing the DMRS density on the time axis, while maintaining the same RS overhead.

In addition, since the BS may set the DMRS interval between two SPGs for the UE, the interval of the DMRSs between the two SPGs may be flexibly set in various slot structures.

According to another embodiment of the present invention, when configuring the front-loaded DMRS and the additional DMRS through the first pattern information and the second pattern information, the BS may configure the DMRSs in consideration of a structure of a slot.

For example, when a guard period or an uplink channel is configured in a slot for transmitting downlink data as illustrated in FIG. 22, an interval of DMRSs between the SPGs of the front-loaded DMRS and the additional DMRS may be set in consideration of a structure of the slot.

Alternatively, the front-loaded DMRS and the additional DMRS may be configured in consideration of multiplexing with other reference signals.

Specifically, the BS may configure the front-loaded DMRS and the additional DMRS by adjusting first pattern information to be multiplexed with a pattern of another reference signal in consideration of multiplexing with a reference signal such as a CSI-RS.

For example, when the CSI-RS is configured as shown in (a) and (b) of FIG. 23, the front-loaded DMRS and the additional DMRS of the antenna ports p0, p1, p2, and p3 may be configured in consideration of multiplexing with the CSI-RS.

The first pattern information, the second pattern information, and the SPG may be configured to be the same between resource block groups (PRGs) to which the same precoding matrix is applied.

Since different precoding matrices may be set between resource block groups (PRGs) to which different precoding matrices are applied, interpolation between PRGs is not performed in the process of channel estimation.

In this case, the channel interpolation performance may be improved through a method of increasing a channel estimation sample in the time domain in the process of channel estimation process described in this disclosure.

Therefore, since channel interpolation is not performed between different PRGs, it is possible to set the same set value of the first pattern information and the second pattern information, and configuration of SPG between different PRGs.

FIGS. 24 to 28 illustrate examples of a method of shifting a DMRS and an additional DMRS in the time domain, as proposed in this disclosure.

Referring to FIGS. 24 to 28, in order to reduce RS overhead due to transmission of additional DMRSs, an OFDM symbol position of the additional DMRS may be set to be different at specific intervals.

Specifically, when the BS maps additional DMRSs, in addition to the front-loaded DMRSs, to OFDM symbols, the BS may set a position of the OFDM symbol, to which the additional DMRS is mapped, to be different for each resource block level in order to increase a channel estimation effect due to the transmission of additional DMRS and reduce the RS overhead.

That is, in order to increase a time density of additional DMRS and minimize an increase of RS overhead, the BS may shift the location of additional DMRS in units of resource blocks.

In the case of shifting the position of additional DMRS according to a resource block level, the BS may inform the UE about whether shifting of the additional DMRS is applied through higher layer signaling (e.g., RRC and/or MAC CE) and/or DCI signaling is applied.

That is, shifting of the additional DMRS may be configured in the UE through higher layer signaling (e.g. RRC and/or MAC CE) and/or DCI signaling.

The UE may know whether the shifting of the additional DMRS is applied through higher layer signaling and/or DCI signaling. When the shifting of the additional DMRS is applied, the UE may receive the DMRS in resource elements of different positions according to RB levels.

Figure 24:
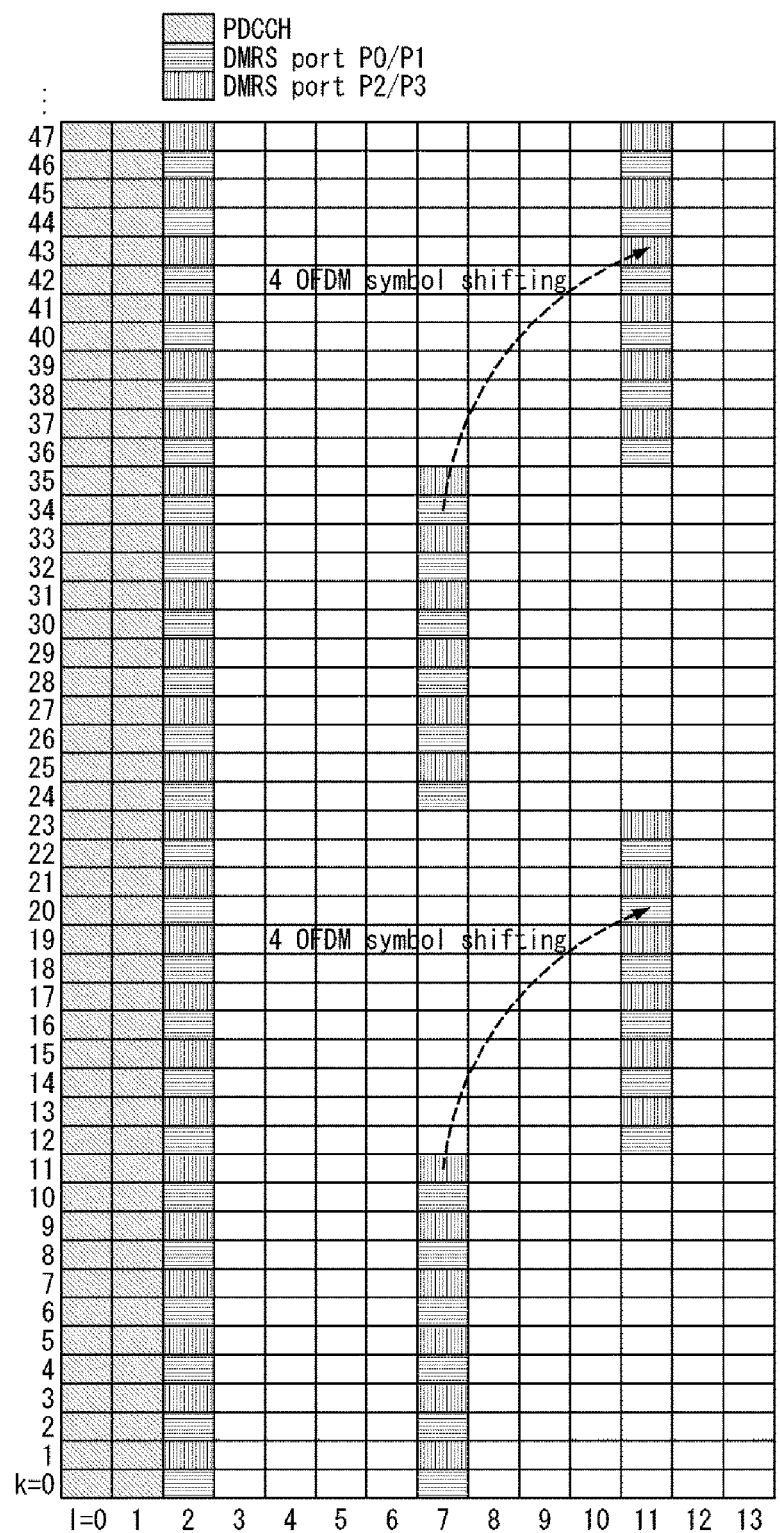
FIGS. 24 to 28 illustrate examples of a method of shifting a DMRS and an additional DMRS in a time domain according to the present specification.

FIG. 24 illustrates an example of a case where positions of additional DMRSs in OFDM symbols are shifted by 4 OFDM symbols and configured for each specific RB level through higher layer signaling.

When the shifting of the additional DMRS is configured through higher layer signaling so that the position of the additional DMRS of an even RB is a first position, a position of the additional DMRS of an odd RB is set to a second position shifted by the specific OFDM symbol from the first position.

For example, in FIG. 24, when the first position is an eighth OFDM symbol (l=7), the second position is a twelfth OFDM symbol (l=11).

In this case, whether the additional DMRS is shifted may be flexibly configured in the UE through 1-bit information of DCI.

Alternatively, the BS may configure the position of additional DMRS to the UE through higher layer signaling (e.g. RRC and/or MAC CE) and/or DCI signaling. Here, the BS may configure the position of additional DMRS to the UE by transmitting the first position information indicating the position of the additional DMRS of the even RB and the second position information indicating the position of the additional DMRS of the odd RB to the UE.

Figure 25:
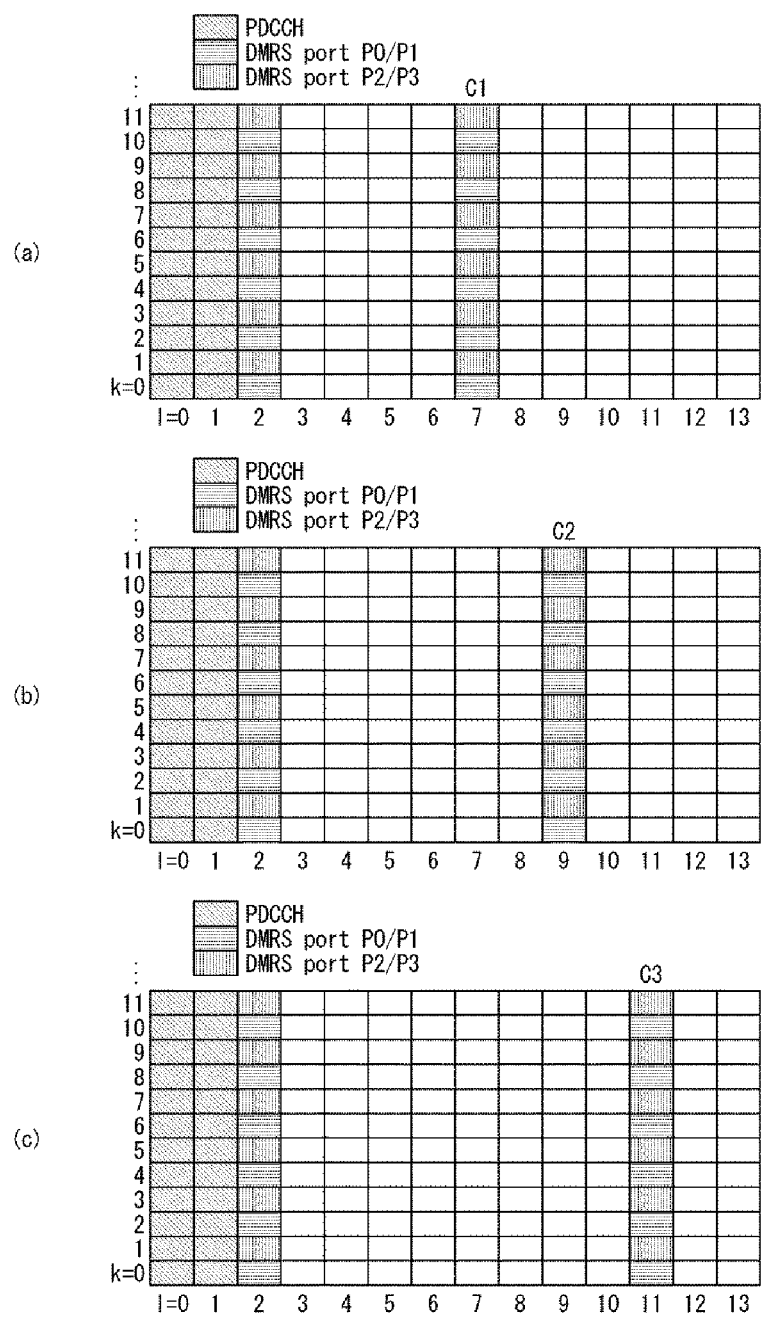

FIG. 25 shows an example of positions of additional DMRSs that may be mapped for each RB unit.

(a) of FIG. 25 illustrates an example in which the additional DMRS is configured in an eighth OFDM symbol (l=7), and (b) of FIG. 25 illustrates an example in which the additional DMRS is configured in a tenth OFDM symbol (l=9).

(c) of FIG. 25 illustrates an example in which the additional DMRS is configured in a twelfth OFDM symbol (l=11).

The BS may transmit the first location information and the second location information indicating one of (a) to (c) of FIG. 25 to the UE, and the UE may set a position of the additional DMRS on the basis of the transmitted first location information and the second location information.

Figure 26:
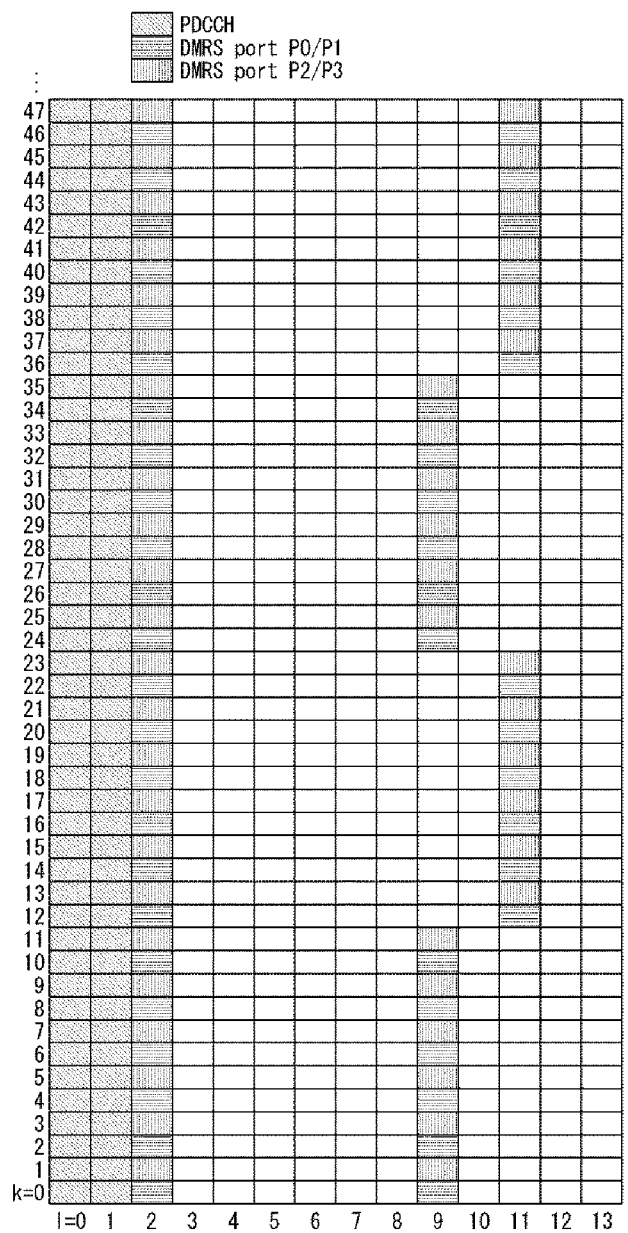

For example, when the first location information indicates (b) of FIG. 25 and the second location information indicates (c) of FIG. 25, the additional DMRS may be set as shown in FIG. 26.

Figure 27:
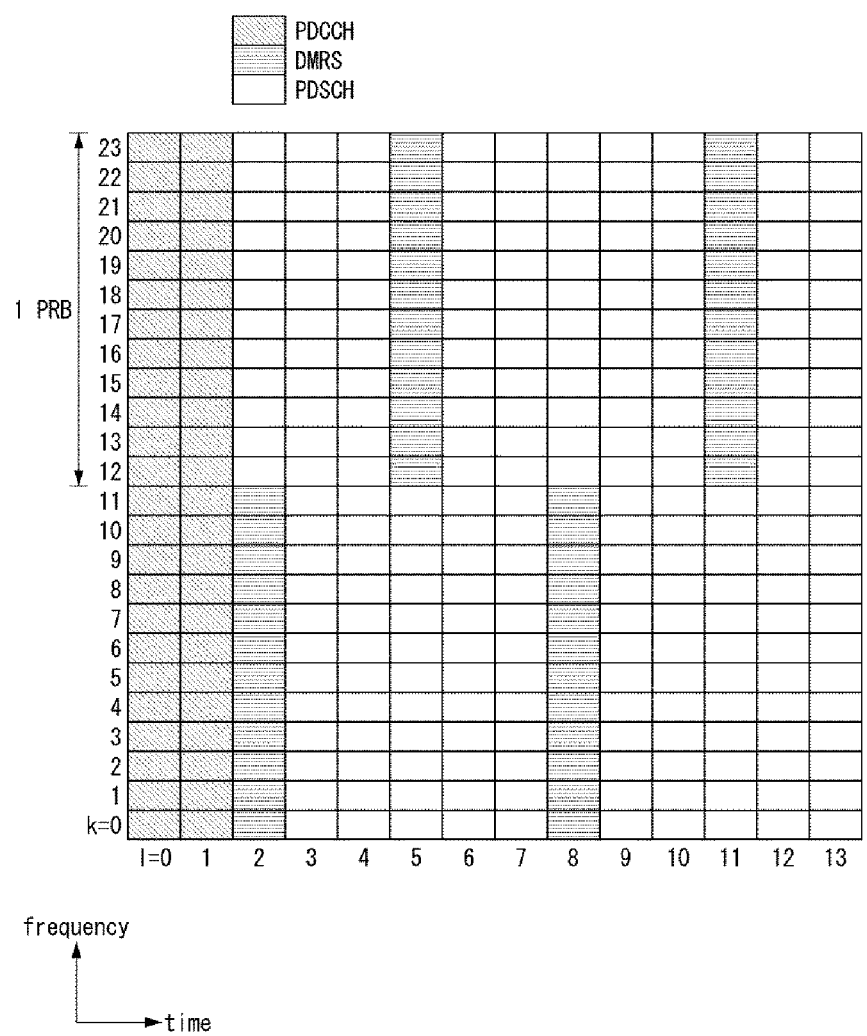

FIG. 27 shows an example of a method of shifting positions of front-loaded DMRSs, as well as additional DMRSs, for each specific PRB unit.

In a case where additional DMRS is additionally configured in addition to the front-loaded DMRS by satisfying a specific condition, the BS may set the OFDM symbol positions in the slots of the front-loaded DMRS and the additional DMRS to be shifted for each specific PRB to prevent an increase in RS overhead.

FIG. 27 shows an example of a method of changing positions of OFDM symbols in slots of front-loaded DMRSs and additional DMRSs per PRB.

In this case, PRB information indicating a PRB unit based on which the positions of the front-loaded DMRS and the additional DMRS are shifted may be signaled to the UE implicitly or explicitly through the following method.

Implicit signaling: The UE recognizes PRB information on the basis of at least one parameter (e.g., bandwidth allocated to UE) related to setting of an OFDM symbol position of the front-loaded DMRS and the additional DMRS. Alternatively, the UE may recognize the PRB information using a value previously set in the transceiver.

Explicit signaling: The BS may transmit the PRB information to the UE through higher layer signaling and/or DCI signaling.

The BS may inform the UE of whether the position of the front-loaded DMRS and the additional DMRS is applied through higher layer signaling and/or DCI signaling.

Alternatively, the corresponding operation may be defined in advance between the BS and the UE so that the shifting of the positions of the front-loaded DMRS and the additional DMRS is applied under a specific condition.

In this case, the specific condition may be a case where the time axis domain density of the DMRS is 'x' or more and/or the number of antenna ports is 'y' or more.

The BS may transmit the specific condition and the PRB information to the UE, and when the specific condition is satisfied on the basis of the received specific condition and the PRB information, the UE may recognize the position where the DMRS is transmitted for each antenna port.

The method described above with reference to FIGS. 24 to 27 has been described using the case where the front-loaded DMRS is configured in one OFDM symbol as an example, but may also be applied to a case where the front-loaded DMRS is configured in two OFDM symbols.

Figure 28:
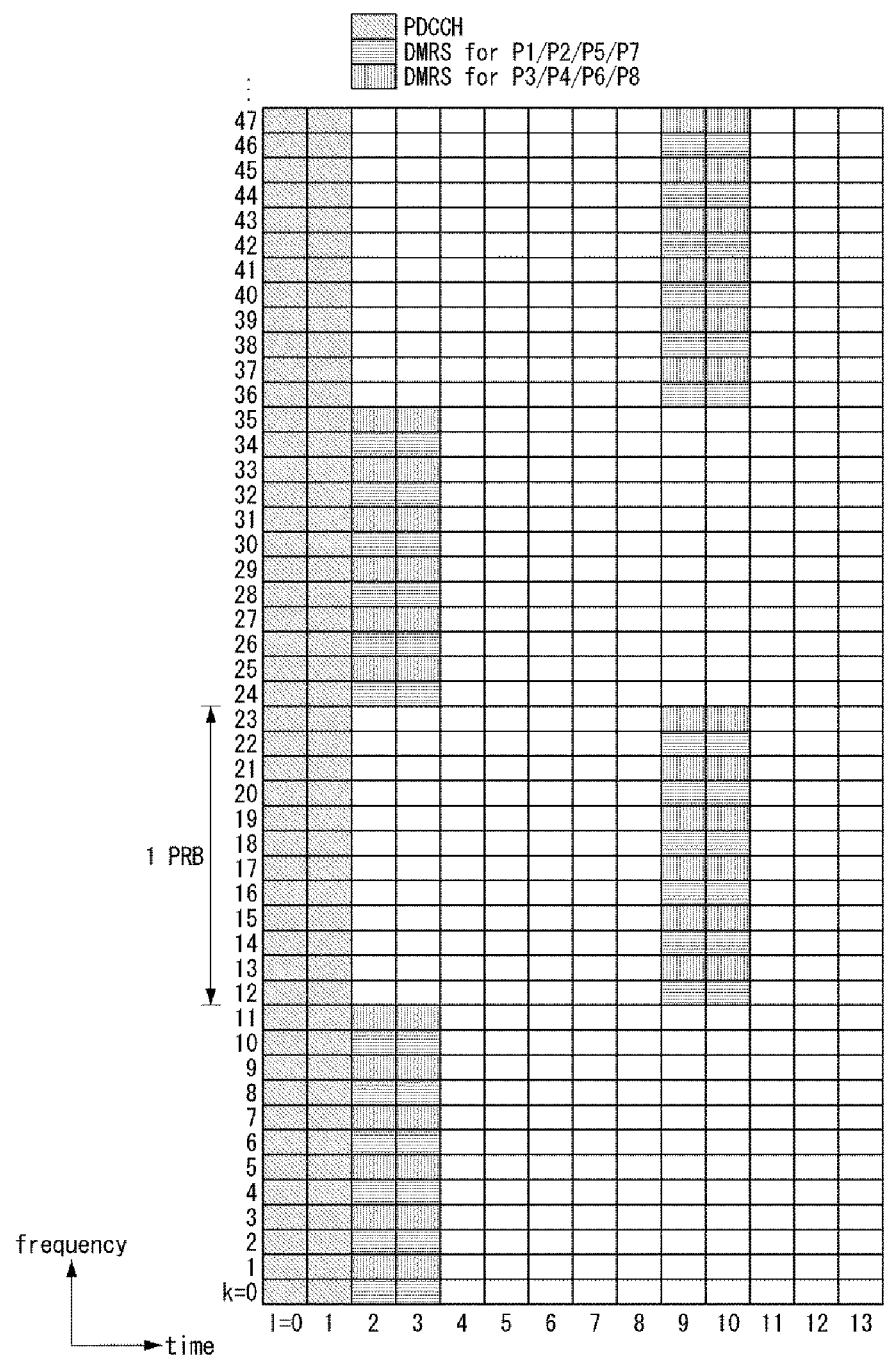

As another embodiment of the present invention, the front-loaded DMRS or the additional DMRS may be turned on/off in a specific PRB unit as shown in FIG. 28.

If the additional DMRS is additionally configured in addition to the front-loaded DMRS by satisfying a specific condition, the BS may set the front-loaded DMRS and the additional DMRS to be turned on/off for each specific PRB to prevent an increase in RS overhead.

FIG. 28 shows an example of a method of turning on/off a front-loaded DMRS or an additional DMRS configured in two OFDM symbols per PRB.

In this case, the PRB information indicating the PRB unit in which the front-loaded DMRS and the additional DMRS are activated or deactivated (or on or off) may be signaled implicitly or explicitly to the UE through the same method as described above.

In addition, the BS may inform the UE of the specific condition in which the front-loaded DMRS and additional DMRS are activated or deactivated (or on or off) through higher layer signaling and/or DCI signaling.

In this case, the specific condition may be a case where the time axis domain density of the DMRS is 'x' or more and/or the number of antenna ports is 'y' or more.

The BS may transmit the specific condition and the PRB information to the UE, and when the specific condition is satisfied on the basis of the received specific condition and the PRB information, the UE may recognize a position where the DMRS is transmitted for each antenna port.

Alternatively, the BS may inform the UE about whether the front-loaded DMRS and the additional DMRS are activated or deactivated through higher layer signaling and/or DCI signaling.

Alternatively, the corresponding operation may be defined in advance between the BS and the UE so that the operation of activating or deactivating the front-loaded DMRS and the additional DMRS is applied under a specific condition.

The method of setting the positions of the front-loaded DMRS and the additional DMRS described above with reference to FIGS. 20 to 28 may also be applied to uplink as well as to downlink.

Figure 29:
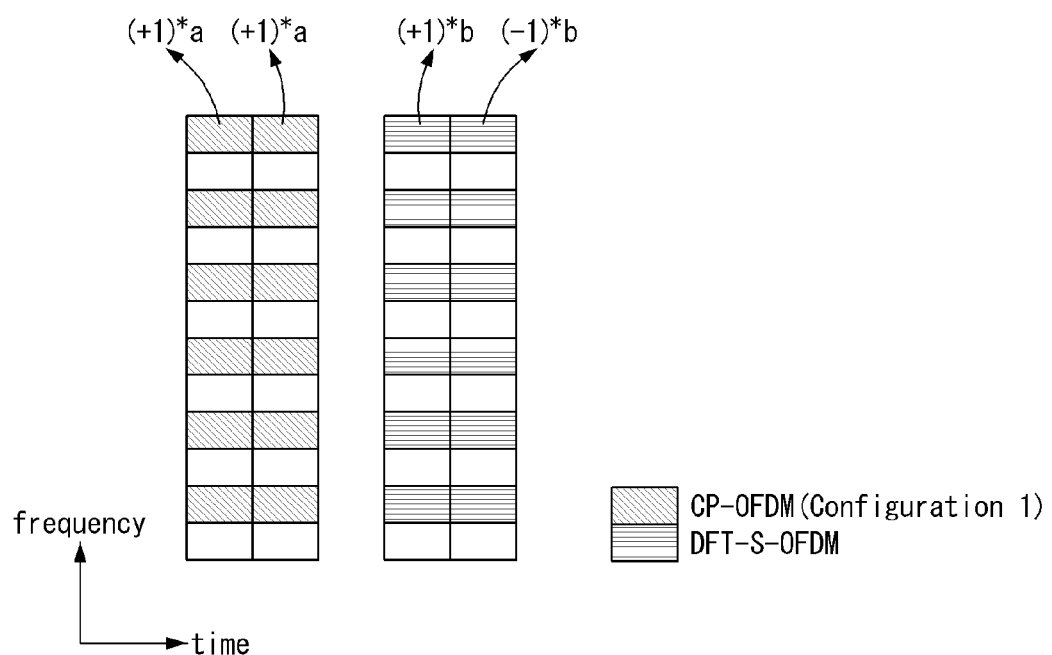
FIG. 29 shows an example of a method of multiplexing a DMRS proposed in this disclosure.

FIG. 29 shows an example of a method of multiplexing a DMRS proposed in this disclosure.

Referring to FIG. 29, DMRS with different sequences may be multiplexed and orthogonal separation is possible between different waveforms through TD-OCC.

Specifically, the front-loaded DMRS and the additional DMRS may have different DMRS sequences according to uplink or downlink waveforms. For example, in a case where a PN sequence may be used for CP-OFDM and a ZC sequence may be used for DFT-S-OFDM.

In this case, multiplexing may be considered between DMRSs to which different sequences are applied, and when DMRSs to which different sequences are applied are multiplexed, orthogonal separation may be possible between different waveforms using TD-OCC.

That is, a DMRS sequence is defined in a OFDM symbol unit for orthogonal separation between different waveforms, and all DMRS symbols (in the case of front-load DMRS and/or additional DMRS) use the same sequence.

DMRSs of different waveforms are separated in the time domain using the DMRS sequence and the TD-OCC.

For example, in FIG. 29, a and b refer to DMRS sequences generated in OFDM symbol units based on a PN sequence and a ZC sequence, respectively.

Since the same RS sequence is used as symbol units, two DMRSs may be orthogonally separated through the TD-OCC although the sequences used for the two waveforms are different.

Figure 30:
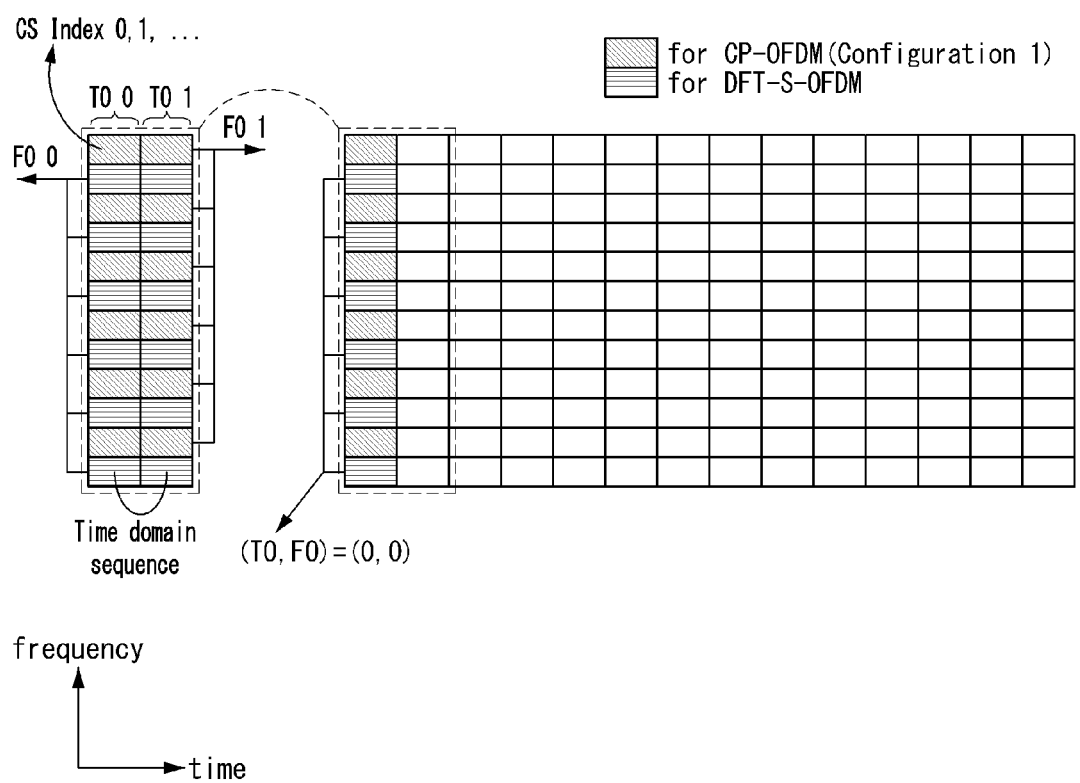
FIG. 30 shows an example of a method of configuring a pattern of a DMRS proposed in this disclosure.

FIG. 30 shows an example of a method of setting a pattern of a DMRS proposed in this disclosure.

Specifically, an IFDM type using comb such as comb 1 and comb 2 may be used as a DMRS pattern for DFT-S-OFDM.

In this case, the BS should transmit an indication on a resource to be used for actual DMRS transmission to the UE. However, unlike CP-OFDM, DFT-S-OFDM may be limited to one port transmission.

When a maximum port is limited to 1, DMRS resources capable of transmitting 1 port may be defined in various forms. For example, it may be defined in consideration of multiplexing between different waveforms or between the same DFT-S-OFDM UEs.

In this case, the BS may define a DFT-S-OFDM DMRS pattern in the form of a resource, and when an MU is applied, an appropriate resource may be allocated to the DFT-S-OFDM UE so as to be orthogonally (e.g., through FDM, TDM, CDM) transmitted.

For example, as illustrated in FIG. 30, the BS defines a DMRS pattern of the DFT-S-OFDM in a resource form, configures corresponding information, and provides the information to the UE.

Example of DMRS resource: frequency offset (FO), time offset (TO), CS index, time domain sequence (e.g. for TD-OCC), Comb type (e.g. Comb 1, Comb 2)

Although the invention described above with reference to FIGS. 7 to 30 has been described on the basis of the downlink DMRS, it is obvious that the present invention may also be applied to an uplink DMRS.

Figure 31:
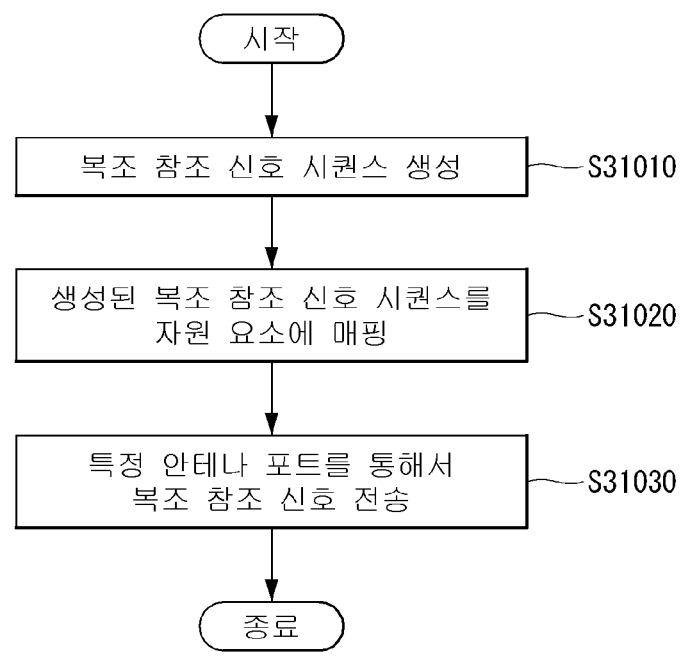
FIG. 31 is a flowchart illustrating an example of a method of generating and transmitting a DMRS and an additional DMRS proposed in this disclosure.

FIG. 31 is a flowchart illustrating an example of a method of generating and transmitting a DMRS and an additional DMRS proposed in this disclosure.

Referring to FIG. 31, a BS generates a DMRS on the basis of a pseudo random sequence (S31010). In this case, the DMRS may be the front-loaded DMRS and/or additional DMRS described above.

Thereafter, the BS maps the generated DMRS sequence to a resource element according to transmission precoding (S31020). In this case, the BS may map the DMRS sequence generated according to a specific pattern to the resource element, and the specific pattern may be one of the patterns described above with reference to FIGS. 7 to 30.

Thereafter, the BS may transmit the DMRS mapped in a specific resource area to at least one UE by using a specific antenna port (S31030).

Figure 32:
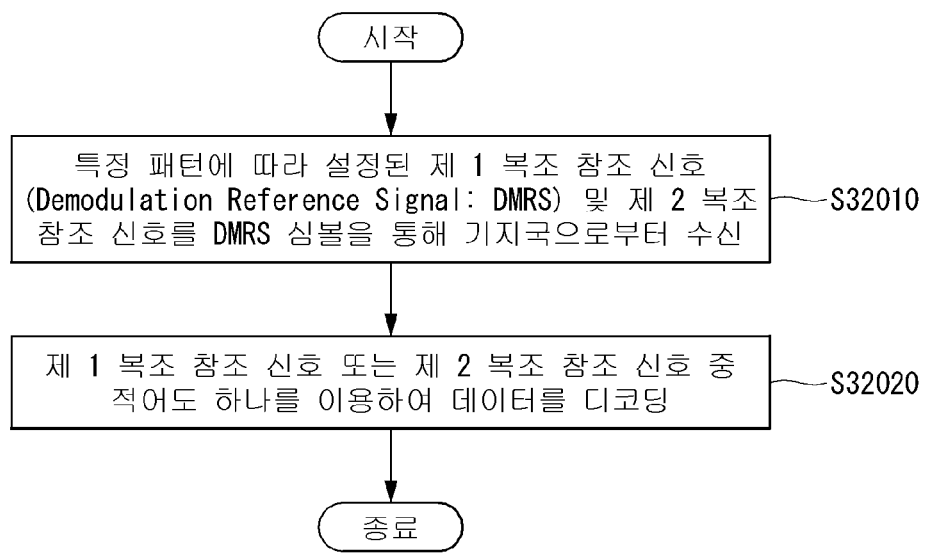
FIG. 32 is a flowchart illustrating an example of a method of receiving a DMRS and an additional DMRS and decoding data proposed in this disclosure.

FIG. 32 is a flowchart illustrating an example of a method of receiving a DMRS and an additional DMRS and decoding data, proposed in this disclosure.

Specifically, a UE receives a first DMRS and a second DMRS set according to a specific pattern from a BS through a DMRS symbol (S32010). In this case, the specific pattern may be one of the patterns described above with reference to FIGS. 7 to 30.

In this case, each of the first DMRS and the second DMRS may be transmitted on a specific antenna port and located on the same time axis symbol as at least one other DMRS transmitted on another antenna port.

In addition, a position of the time axis symbol of the second DMRS may be determined according to a service type of the transmitted data.

Thereafter, the UE may perform channel estimation using at least one of the received first DMRS or the second DMRS, and receive data through the estimated channel and decode the received data (S32020).

Figure 33:
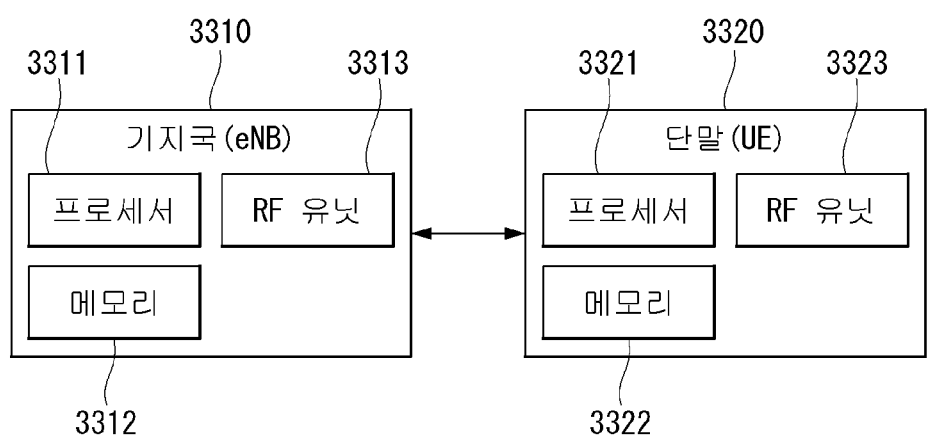
FIG. 33 illustrates an example of an internal block diagram of a wireless device to which the present invention may be applied.

FIG. 33 illustrates an example of an internal block diagram of a wireless device to which the present invention may be applied.

Here, the wireless device may be a BS and a UE, and the BS includes both a macro BS and a small BS.

As illustrated in FIG. 33, a BS 3310 and a UE 3320 include a communication unit (transceiver unit or RF unit, 3313 and 3323), processors 3311 and 3321, and memories 3312 and 3322, respectively.

In addition], the BS and the UE may further include an input unit and an output unit.

The communication units 3313 and 3323, the processors 3311 and 3321, the input unit, the output unit, and the memories 3312 and 3322 are functionally connected to perform the method proposed in this disclosure.

When information generated by a physical layer (PHY) protocol is received, the communication units (transceiver unit or RF unit, 3313 and 3323) transfer the received information to a radio-frequency (RF) spectrum, perform filtering, amplification, and the like, and transmit the resultant information to the antenna. In addition, the communication units function to move an RF signal received from the antenna to a band that may be processed by the PHY protocol and perform filtering.

The communication units may also include a switch function for switching the transmission and reception functions.

The processors 3311 and 3321 implement the functions, processes, and/or methods proposed in this disclosure. Layers of an air interface protocol may be implemented by the processors.

The processors may be represented by a controller, a control unit, a computer, or the like.

The memories 3312 and 3322 are connected to the processors and store protocols or parameters for performing an uplink resource allocation method.

The processors 3311 and 3321 may include an application-specific integrated circuit (ASIC), another chipset, a logic circuit, and/or a data processing device. The memories may include read-only memory (ROM), random access memory (RAM), flash memory, memory card, storage medium and/or other storage device. The communication units may include a baseband circuit for processing a wireless signal. When the embodiment is implemented in software, the above-described technique may be implemented as a module (process, function, etc.) for performing the functions described above.

The module may be stored in the memories and executed by the processors. The memories may be present within or outside the processors and may be connected to the processors by various well known means.

The output unit (display unit) is controlled by the processors and outputs information output from the processors together with a key input signal generated by a key input unit and various information signals from the processors.

Although respective drawings are divisionally described for convenience of description, the embodiments described in the respective drawings may be designed so as to be combined to implement a new embodiment. When necessary, design of a recording medium readable by a computer in which a program to execute the above-described embodiments is recorded may fall within the scope of the appended claims and their equivalents.

As for the method of providing a wireless docking service according to the present disclosure, the configuration and method according to the embodiments of the present disclosure described above are not limited in its application, but the entirety or a portion of the embodiments may be selectively combined to be configured into various modifications.

In the embodiments of the present invention, the method of transmitting and receiving data according to the present disclosure may be implemented as codes that may be read by a processor provided in a network device in a recording medium. The processor-readable recording medium may include any type of recording devices in which data that may be read by the processor is stored. The processor-readable recording medium may include a ROM, a RAM, a CD-ROM, a magnetic tape, a floppy disk, an optical data storage device, and the like. The processor-readable medium also includes implementations in the form of carrier waves or signals, e.g., transmission via the Internet. The processor-readable recording medium may be distributed over network-coupled computer systems so that the processor-readable code may be stored and executed in a distributed fashion.

Specific exemplary embodiments have been described. However, the present disclosure is not limited to the specific exemplary embodiments and various modifications may be made without departing from the scope of the present invention claimed in the claims, and such modifications should not be individually understood from technical concepts or prospects of the present disclosure.

Further, although the disclosure has described both product inventions and process inventions, description of both inventions may be complementarily applied as needed.

INDUSTRIAL APPLICABILITY

An example in which the method of transmitting and receiving a reference signal in a wireless communication system of the present invention has been illustrated as being applied to the 3GPP LTE/LTE-A system, but the method may be applied to various wireless communication systems in addition to the 3GPP LTE/LTE-A system.

The invention claimed is:

1. A method of performing decoding by a user equipment (UE) in a wireless communication system, the method comprising:
    receiving, from a base station (BS) a first demodulation reference signal (DMRS) and a second DMRS set according to a specific pattern via DMRS symbols, wherein each of the first DMRS and the second DMRS is transmitted on a specific antenna port and is located on the same time axis symbol as at least one other DMRS transmitted on the other antenna port, and a position of a time axis symbol of the second DMRS is determined according to a service type of transmitted data; and
    decoding the data using at least one of the first DMRS and the second DMRS.

2. The method of claim 1, wherein the time axis symbol position of at least one of the first DMRS and the second DMRS is shifted in units of a specific physical resource block (PRB), if a specific condition is met.

3. The method of claim 2, wherein the specific condition is at least one of a condition that the number of DMRSs required according to the service type is one or more and a condition that the number of antenna ports in which the DMRSs are transmitted is two or more.

4. The method of claim 2, wherein the specific PRB unit is determined according to a bandwidth allocated to the UE.

5. The method of claim 4, further comprising: receiving control information representing the specific PRB unit from the BS.

6. The method of claim 1, wherein the first DMRS and the second DMRS are turned off at every specific PRB.

7. A user equipment (UE) performing decoding in a wireless communication system, the UE comprising:
    a radio frequency (RF) unit transmitting and receiving a radio signal to and from the outside; and
    a processor functionally coupled with the RF unit,
    wherein the processor receives, from a base station (BS) a first demodulation reference signal (DMRS) and a second DMRS set according to a specific pattern via DMRS symbols,
    wherein each of the first DMRS and the second DMRS is transmitted on a specific antenna port and is located on the same time axis symbol as at least one other DMRS transmitted on the other antenna port, and a position of a time axis symbol of the second DMRS is determined according to a service type of transmitted data, and
    the processor decodes the data using at least one of the first DMRS and the second DMRS.

8. The UE of claim 7, wherein the time axis symbol position of at least one of the first DMRS and the second DMRS is shifted in units of a specific physical resource block (PRB), if a specific condition is met.

9. The UE of claim 8, wherein the specific condition is at least one of a condition that the number of DMRSs required according to the service type is one or more and a condition that the number of antenna ports in which the DMRSs are transmitted is two or more.

10. The UE of claim 8, wherein the specific PRB unit is determined according to a bandwidth allocated to the UE.

11. The UE of claim 8, wherein the processor receives control information representing the specific PRB unit from the BS.

12. The UE of claim 7, wherein the first DMRS and the second DMRS are turned off at every specific PRB.

* * * * *